United States Patent
Sakai

(10) Patent No.: US 10,302,942 B2
(45) Date of Patent: May 28, 2019

(54) LIGHT-SOURCE DEVICE, IMAGE DISPLAY APPARATUS, AND OBJECT APPARATUS

(71) Applicant: Kohji Sakai, Tokyo (JP)

(72) Inventor: Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/686,979

(22) Filed: Aug. 25, 2017

(65) Prior Publication Data

US 2018/0067308 A1 Mar. 8, 2018

(30) Foreign Application Priority Data

Sep. 8, 2016 (JP) .................................. 2016-175141

(51) Int. Cl.
*G02B 27/01* (2006.01)
*H05B 37/02* (2006.01)
*G02B 27/10* (2006.01)
*G02B 27/14* (2006.01)
*H04N 9/31* (2006.01)

(52) U.S. Cl.
CPC ......... *G02B 27/0101* (2013.01); *G02B 27/01* (2013.01); *G02B 27/104* (2013.01);
(Continued)

(58) Field of Classification Search
CPC .............. G02B 27/0101; G02B 27/108; G02B 2027/0114; G02B 27/104; G02B 27/141;
(Continued)

(56) References Cited

U.S. PATENT DOCUMENTS 5,831,758 A * 11/1998 Sakai ................... G02B 26/123
359/204.1
5,999,345 A * 12/1999 Nakajima .............. G02B 27/09
250/234

(Continued)

FOREIGN PATENT DOCUMENTS

EP 2 905 647 A1 8/2015
EP 3 226 555 A1 10/2017
(Continued)

OTHER PUBLICATIONS

Extended European Search Report dated Jan. 30, 2018 in Patent Application No. 17189953.7, 9 pages.
(Continued)

*Primary Examiner* — Frank G Font
(74) *Attorney, Agent, or Firm* — Oblon, McClelland, Maier & Neustadt, L.L.P.

(57) ABSTRACT

A light-source device including a light-emitting element to emit light, a light-receiving system, an acquisition unit, a setting unit, and an adjuster. The light-receiving system receives the light emitted from the light emitting element. The acquisition unit acquires a wavelength of the light emitted from the light emitting element. The setting unit sets a target value of an amount of the light received by the light-receiving system based on the wavelength acquired by the acquisition unit. The adjuster adjusts an amount of the light emitted from the light emitting element such that the amount of the light reaches the target value of the light that is set with the setting unit.

20 Claims, 21 Drawing Sheets

(52) U.S. Cl.
CPC ......... *G02B 27/108* (2013.01); *G02B 27/141* (2013.01); *H04N 9/3129* (2013.01); *H04N 9/3155* (2013.01); *H04N 9/3161* (2013.01); *H04N 9/3164* (2013.01); *H04N 9/3182* (2013.01); *H05B 37/0227* (2013.01); *G02B 2027/0112* (2013.01); *G02B 2027/0114* (2013.01)

(58) Field of Classification Search
CPC ............. H05B 37/0227; H04N 9/3161; H04N 9/3155; G01J 3/02; G01J 3/0264; G01J 3/0286; G01J 3/50; G01J 3/10; G01N 21/64; G01N 21/68; H01J 33/32935
USPC ...................................................... 359/204.4
See application file for complete search history.

(56) References Cited

U.S. PATENT DOCUMENTS

| | | | |
|---|---|---|---|
| 6,166,842 A | 12/2000 | Aoki et al. | |
| 6,229,638 B1 | 5/2001 | Sakai et al. | |
| 6,256,133 B1 | 7/2001 | Suzuki et al. | |
| 6,288,819 B1 | 9/2001 | Aoki et al. | |
| 6,347,004 B1 | 2/2002 | Suzuki et al. | |
| 6,366,384 B1* | 4/2002 | Aoki ........................ | B41J 2/473 347/233 |
| 6,509,995 B1 | 1/2003 | Suzuki et al. | |
| 6,596,985 B2 | 7/2003 | Sakai et al. | |
| RE40,109 E | 2/2008 | Sakai et al. | |
| RE45,918 E | 3/2016 | Saisho et al. | |
| 2001/0022343 A1* | 9/2001 | Sakai .................. | G02B 26/123 250/234 |
| 2001/0043382 A1 | 11/2001 | Suzuki et al. | |
| 2001/0048543 A1 | 12/2001 | Aok et al. | |
| 2001/0053014 A1 | 12/2001 | Aok et al. | |
| 2001/0055140 A1 | 12/2001 | Sakai et al. | |
| 2002/0159122 A1 | 10/2002 | Aoki et al. | |
| 2003/0063355 A1 | 4/2003 | Suzuki et al. | |
| 2003/0072065 A1 | 4/2003 | Suzuki et al. | |
| 2003/0209659 A1* | 11/2003 | Sakai .................. | G02B 26/123 250/234 |
| 2003/0214694 A1 | 11/2003 | Sakai et al. | |
| 2004/0090520 A1* | 5/2004 | Sakai ........................ | B41J 2/473 347/225 |
| 2004/0100674 A1 | 5/2004 | Sakai et al. | |
| 2004/0184127 A1 | 9/2004 | Nakajima et al. | |
| 2006/0077500 A1 | 4/2006 | Hayashi et al. | |
| 2006/0187294 A1 | 8/2006 | Saisho et al. | |
| 2007/0091398 A1 | 4/2007 | Ueda et al. | |
| 2007/0211324 A1 | 9/2007 | Sakai et al. | |
| 2007/0211326 A1 | 9/2007 | Saisho et al. | |
| 2007/0253048 A1 | 11/2007 | Sakai et al. | |
| 2008/0024589 A1* | 1/2008 | Ueda .................. | G02B 26/123 347/241 |
| 2008/0025759 A1 | 1/2008 | Ichii et al. | |
| 2008/0055692 A1 | 3/2008 | Saisho et al. | |
| 2008/0068689 A1 | 3/2008 | Saisho et al. | |
| 2008/0068693 A1 | 3/2008 | Hayashi et al. | |
| 2009/0002792 A1 | 1/2009 | Sakai et al. | |
| 2009/0059333 A1 | 3/2009 | Sakai et al. | |
| 2009/0206236 A1 | 8/2009 | Kawashima et al. | |
| 2010/0194843 A1 | 8/2010 | Sakai et al. | |
| 2011/0063594 A1 | 3/2011 | Sakai et al. | |
| 2011/0090549 A1 | 4/2011 | Sakai et al. | |
| 2011/0128602 A1 | 6/2011 | Hamano et al. | |
| 2011/0228368 A1 | 9/2011 | Sakai et al. | |
| 2011/0299104 A1* | 12/2011 | Seo ........................... | G01J 3/02 358/1.9 |
| 2012/0050139 A1 | 3/2012 | Wang et al. | |
| 2012/0050444 A1 | 3/2012 | Sakai et al. | |
| 2013/0070323 A1 | 3/2013 | Tokita et al. | |
| 2013/0076851 A1 | 3/2013 | Watanabe et al. | |
| 2013/0155166 A1 | 6/2013 | Watanabe et al. | |
| 2013/0250029 A1 | 9/2013 | Kubo et al. | |
| 2013/0321803 A1* | 12/2013 | Kohara ................. | G01N 21/69 356/313 |
| 2014/0192331 A1 | 7/2014 | Toyooka | |
| 2014/0340649 A1* | 11/2014 | Takahashi ............ | G03B 21/204 353/31 |
| 2015/0260984 A1 | 9/2015 | Yamakawa et al. | |
| 2015/0346484 A1 | 12/2015 | Suzuki et al. | |
| 2016/0109715 A1 | 4/2016 | Wang et al. | |
| 2016/0261090 A1 | 9/2016 | Sakai et al. | |
| 2016/0353070 A1* | 12/2016 | Okamoto ............ | H05B 33/0869 |
| 2017/0276546 A1* | 9/2017 | Sakai .................... | G01J 3/0264 |

FOREIGN PATENT DOCUMENTS

| | | |
|---|---|---|
| JP | 2007-188092 | 7/2007 |
| JP | 2007-193349 | 8/2007 |
| JP | 2007-206707 | 8/2007 |
| JP | 2008-052247 | 3/2008 |
| JP | 2008-070797 | 3/2008 |
| JP | 2008-076526 | 4/2008 |
| JP | 2008-076557 | 4/2008 |
| JP | 2008-107581 | 5/2008 |
| JP | 2008-122811 | 5/2008 |
| JP | 2009-058677 | 3/2009 |
| JP | 2009-098562 | 5/2009 |
| JP | 2009-300689 | 12/2009 |
| JP | 2010-049232 | 3/2010 |
| JP | 2010-071732 | 4/2010 |
| JP | 2010-197990 | 9/2010 |
| JP | 2010-210966 | 9/2010 |
| JP | 2010-217353 | 9/2010 |
| JP | 2011-018055 | 1/2011 |
| JP | 2011-066031 | 3/2011 |
| JP | 2011-090111 | 5/2011 |
| JP | 2011-180427 | 9/2011 |
| JP | 2012-047863 | 3/2012 |
| JP | 2012-150153 | 8/2012 |
| JP | 2012-168542 | 9/2012 |
| JP | 2012-220695 | 11/2012 |
| JP | 2012-225960 | 11/2012 |
| JP | 2012-252347 | 12/2012 |
| JP | 2013-003329 | 1/2013 |
| JP | 2013-025003 | 2/2013 |
| JP | 2013-025217 | 2/2013 |
| JP | 2013-033123 | 2/2013 |
| JP | 2013-041011 | 2/2013 |
| JP | 2013-068691 | 4/2013 |
| JP | 2013-068694 | 4/2013 |
| JP | 2013-068698 | 4/2013 |
| JP | 2013-068812 | 4/2013 |
| JP | 2013-072910 | 4/2013 |
| JP | 2013-109113 | 6/2013 |
| JP | 2013-160818 | 8/2013 |
| JP | 2013-160971 | 8/2013 |
| JP | 2013-164483 | 8/2013 |
| JP | 2013-178477 | 9/2013 |
| JP | 2013-200439 | 10/2013 |
| JP | 2013-200441 | 10/2013 |
| JP | 2014-026205 | 2/2014 |
| JP | 2014-071221 | 4/2014 |
| JP | 2014-098814 | 5/2014 |
| JP | 2014-137471 | 7/2014 |
| JP | 2014-203011 | 10/2014 |
| JP | 2015-148665 | 8/2015 |
| JP | 2015-227986 | 12/2015 |
| JP | 2016-161533 | 9/2016 |
| JP | 2017-062487 | 3/2017 |
| WO | WO 2012/024840 A1 | 3/2012 |

OTHER PUBLICATIONS

Gerard Harbers, et al. "Performance of High Power Light Emitting Diodes in Display Illumination Applications", Journal of Display Technology, vol. 3, No. 2, XP011182138, 2007, pp. 98-109.

* cited by examiner

FIG. 8

| EXTERNAL LIGHT LUMINANCE | VIRTUAL IMAGE LUMINANCE | AMOUNT OF REDUCTION | POWER MODULATION | PW MODULATION |
|---|---|---|---|---|
| $L_{EXTERNAL}^{(Max)}$ | $L^{(0)}$=REFERENCE LUMINANCE | 100% | 100% | DUTY RATIO =100% |
| $L_{EXTERNAL}^{(2)}$ | $L^{(0)}_2$ | $d_2$% | $f_2$% | $h_2$% |
| $L_{EXTERNAL}^{(3)}$ | $L^{(0)}_3$ | $d_3$% | $f_3$% | $h_3$% |
| ... | ... | ... | ... | ... |
| $L_{EXTERNAL}^{(48)}$ | $L^{(0)}_{48}$ | $d_{48}$% | $f_{48}$% | $h_{48}$% |
| $L_{EXTERNAL}^{(49)}$ | $L^{(0)}_{49}$ | $d_{49}$% | $f_{49}$% | $h_{49}$% |
| $L_{EXTERNAL}^{(Min)}$ | $L^{(0)}_{50}$ | $d_{50}$% | $f_{50}$% | $h_{50}$% |

AMOUNT OF DOWN $d = f \times h$

FIG. 9

LOOK-UP TABLE

| AMBIENT TEMPERATURE | EXTERNAL LIGHT LUMINANCE | GRADATION | $P_{moni}^{(R)}$ | $P_{moni}^{(G)}$ | $P_{moni}^{(B)}$ |
|---|---|---|---|---|---|
| $T_a = -20°C$ | $L_{EXTERNAL}^{(Max)}$ | 256 level | $P_{moni}^{(R)}{}_{-20,1,256}$ | $P_{moni}^{(G)}{}_{-20,1,256}$ | $P_{moni}^{(B)}{}_{-20,1,256}$ |
| | | 255 level | $P_{moni}^{(R)}{}_{-20,1,255}$ | $P_{moni}^{(G)}{}_{-20,1,255}$ | $P_{moni}^{(B)}{}_{-20,1,255}$ |
| | | ... | ... | ... | ... |
| | $L_{EXTERNAL}^{(2)}$ | 256 level | $P_{moni}^{(R)}{}_{-20,2,256}$ | $P_{moni}^{(G)}{}_{-20,2,256}$ | $P_{moni}^{(B)}{}_{-20,2,256}$ |
| | | 255 level | $P_{moni}^{(R)}{}_{-20,2,255}$ | $P_{moni}^{(G)}{}_{-20,2,255}$ | $P_{moni}^{(B)}{}_{-20,2,255}$ |
| | ... | | | | |
| | $L_{EXTERNAL}^{(Min)}$ | 256 level | $P_{moni}^{(R)}{}_{-20,50,256}$ | $P_{moni}^{(G)}{}_{-20,50,256}$ | $P_{moni}^{(B)}{}_{-20,50,256}$ |
| | | 255 level | $P_{moni}^{(R)}{}_{-20,50,255}$ | $P_{moni}^{(G)}{}_{-20,50,255}$ | $P_{moni}^{(B)}{}_{-20,50,255}$ |
| $T_a = -19°C$ | $L_{EXTERNAL}^{(Max)}$ | 256 level | $P_{moni}^{(R)}{}_{-19,1,256}$ | $P_{moni}^{(G)}{}_{-19,1,256}$ | $P_{moni}^{(B)}{}_{-19,1,256}$ |
| | | 255 level | $P_{moni}^{(R)}{}_{-19,1,255}$ | $P_{moni}^{(G)}{}_{-19,1,255}$ | $P_{moni}^{(B)}{}_{-19,1,255}$ |
| | ... | | | | |
| $T_a = 60°C$ | $L_{EXTERNAL}^{(Max)}$ | 256 level | $P_{moni}^{(R)}{}_{60,1,256}$ | $P_{moni}^{(G)}{}_{60,1,256}$ | $P_{moni}^{(B)}{}_{60,1,256}$ |
| | | 255 level | $P_{moni}^{(R)}{}_{60,1,255}$ | $P_{moni}^{(G)}{}_{60,1,255}$ | $P_{moni}^{(B)}{}_{60,1,255}$ |
| | ... | | | | |

$P_{moni}^{(R)}{}_{-20,1,256} = P_{moni}^{(R)}{}_{Max}, P_{moni}^{(G)}{}_{-20,1,256} = P_{moni}^{(G)}{}_{Max},$
$P_{moni}^{(B)}{}_{-20,1,256} = P_{moni}^{(B)}{}_{Max}$

LIGHT-SOURCE DEVICE, IMAGE DISPLAY APPARATUS, AND OBJECT APPARATUS

CROSS-REFERENCE TO RELATED APPLICATIONS

This patent application is based on and claims priority pursuant to 35 U.S.C. § 119(a) to Japanese Patent Application No. 2016-175141, filed on Sep. 8, 2016 in the Japan Patent Office, the entire disclosures of which is hereby incorporated by reference herein.

BACKGROUND

Technical Field

Embodiments of the present disclosure relate to a light-source device, an image display apparatus, and an object apparatus.

Related Art

A heads-up display (HUD) is known that generates image light and emits the image light to a windshield of a mobile object, such as a vehicle, to display a virtual image.

Some HUDs combine light beams having three wavelengths emitted from semiconductor lasers and display a virtual image.

To generate any desired colored light with higher color reproducibility, such a HUD preferably sets an appropriate power balance between laser beams having three different wavelengths emitted from the semiconductor lasers, according to the wavelengths of the laser beams.

There is room for improvement in setting a desired power balance between laser beams emitted from three semiconductor lasers having different wavelengths in a typical HUD. In other words, the typical HUD has room for improvement in generating light that is any desired colored light.

SUMMARY

In one aspect of this disclosure, there is provided an improved light-source device including a light-emitting element to emit light, a light-receiving system, an acquisition unit, a setting unit, and an adjuster. The light-receiving system receives the light emitted from the light emitting element. The acquisition unit to acquire a wavelength of the light emitted from the light emitting element. The setting unit sets a target value of an amount of the light received by the light-receiving system based on the wavelength acquired by the acquisition unit. The adjuster adjusts an amount of the light emitted from the light emitting element such that the amount of the light reaches the target value of the light that is set with the setting unit.

In another aspect of this disclosure, there is provided an improved light-source device including a light-emitting element to emit light, a light-receiving system, a detection system, a setting unit, and an adjuster. The light-receiving system receives the light emitted from the light emitting element. The detection system detects an ambient temperature of the light-emitting element. The setting unit sets a target value of an amount of the light received by the light-receiving system based on a detection result of the detection system. The adjuster adjusts an amount of the light emitted from the light emitting element to obtain the target value of the light received by the light-receiving system.

In still another aspect of this disclosure, there is provided an improved light-source device including a light-emitting element to emit light, a light-receiving system, a detection system, a memory, a setting unit, and an adjuster. The light-receiving system receives the light emitted from the light emitting element. The detection system detects an ambient temperature of the light-emitting element. The memory stores a table representing a relation between at least a first target value of the light received by the light-receiving system and the ambient temperature of the light-emitting element. The setting unit sets a second target value of the light received by the light-receiving system based on a detection result of the detection system and the table. The adjuster adjusts an amount of the light emitted from the light emitting element to obtain the second target value.

In yet another aspect of this disclosure, there is provided an improved image display apparatus including the above-described light-source device and an image forming element. The image forming element forms an image by the light emitted from the light-source device, to be displayed as a display image by the image display apparatus.

In further aspect of this disclosure, there is provided an improved object apparatus including the above-described image display apparatus and an object equipped with the image display apparatus.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 8 is a correspondence table of the luminance of external light, the luminance of a virtual image, the amount of down, a power modulation, and a pulse width (PW) modulation;

FIG. 9 is a look-up table for describing a relation between, an ambient temperature, the luminance of the external light, the gradation, three target values of monitor light intensity;

Figure 1:
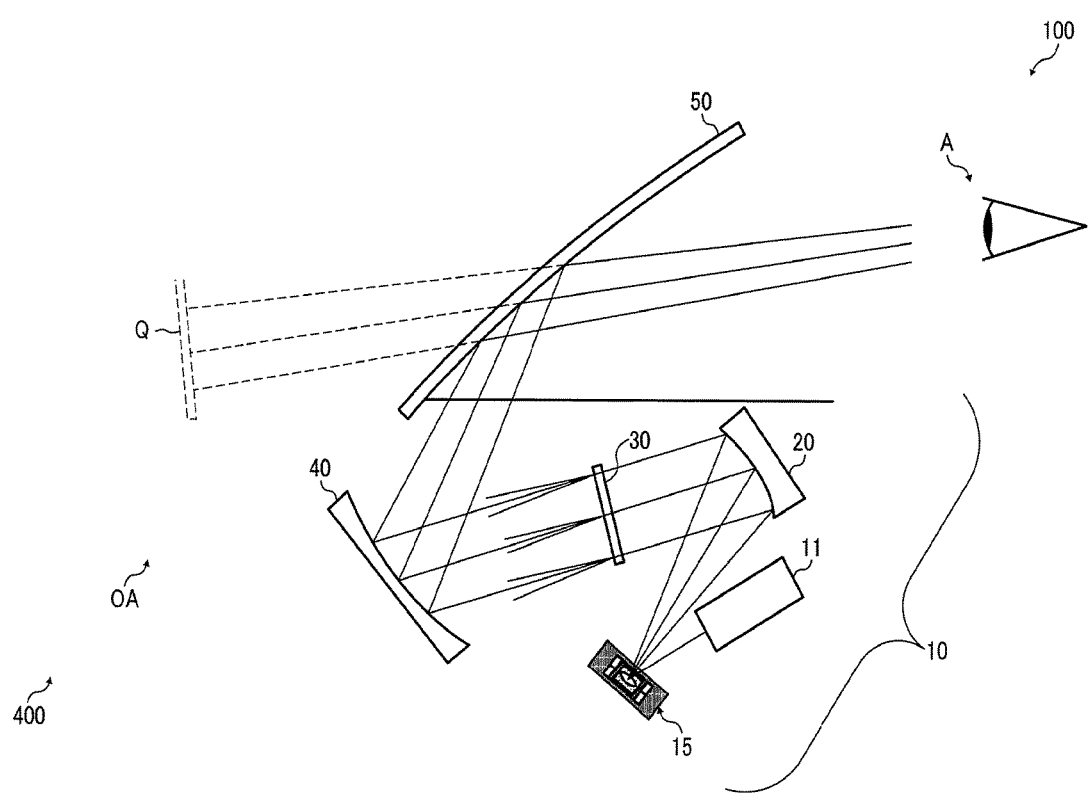
FIG. 1 is an illustration of a schematic configuration of a heads-up display (HUD) according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

A description is given of a heads-up display (HUD) 100 as an image display apparatus according to an embodiment of the present disclosure, referring to the figures. Note that, in the specification, the term "HUD" stands for a heads-up display.

FIG. 1 is an illustration of a schematic configuration of the HUD 100 according to the present embodiment.

Schematic Configuration of HUD

As the HUD projection method, there is a "panel system" and a "laser scanning system". In the panel system, an imaging device, such as a liquid crystal display (LCD), a digital micro-mirror device (DMD) panel (digital mirror device panel), or a vacuum fluorescent display (VFD) is used to form an intermediate image. In the laser scanning method, a two-dimensional scanning device scans with a laser beam emitted from a laser beam source to form an intermediate image. In particular, in the latter laser scan type, unlike the panel type where the image is formed by partial light blocking over the entire screen emission, since emitting or non-emitting can be assigned to each pixel on a pixel-by-pixel basis, in general, a high-contrast image can be formed.

In view of the above, the HUD 100 according to the present embodiment adopts the laser scanning system. In some embodiments, the HUD 100 according to the present embodiment may adopt the above-described panel system as the projection system.

The HUD 100 is mounted, for example, on a mobile object 400 such as a vehicle, an aircraft, or a ship, and makes navigation information used for operating the mobile object (for example, speed of the mobile object, direction of travel of the mobile object 400, distance to a destination, name of current place, the presence and position of an object ahead of the mobile object 400, sign, such as speed limit, and traffic congestion information) visible through a front window 50 (see FIG. 1) of the mobile object 400. In such a case, the front window 50 also serves as a transmission and reflection member that transmits a portion of the incident light and reflects at least some of the remaining incident light. In the following description, cases in which the HUD 100 is mounted on a vehicle including the front window 50 are described.

As illustrated in FIG. 1, the HUD 100 includes an optical scanning device 10, a screen 30, and a concave mirror 40. The optical scanning device 10 includes a light-source unit 11, a light deflector 15, and a scanning mirror 20 (for example, a concave mirror). The HUD 100 emits light (image light) for forming an image to the front windshield 50, to allow a viewer A (in the present embodiment, a driver of a vehicle) to visually identify a virtual image Q at eye-level. In other words, the viewer A can visually identify, through the front window 50, an image (intermediate image) as the virtual image Q formed (drawn) on the screen 30 by the optical scanning device 10.

The HUD 100 is disposed under the dashboard of the vehicle, as an example. The distance from the location of the eye of the viewer A to the front window 50 ranges from several tens of centimeters (cm) to approximately 1 meter (m).

In the present embodiment, the concave mirror 40 is designed by using a commercially available optical-designed simulation software such that the concave mirror 40 obtains a predetermined level of light-gathering power to achieve a desired image-forming position of the virtual image Q.

In the HUD 100, the light-gathering power of the concave mirror 40 is designed such that the virtual image Q is displayed at a position (in depth) with 1 m or more and 10 m or less (preferably 6 m or less) away from the eye of the viewer A.

The front windshield 50 typically has a slightly curved surface, and is not a flat plane. The curved surfaces of the concave mirror 40 and the front window 50 determine the image-forming position of the virtual image Q.

The light-source unit 11 combines laser beams of three colors R (red), G (green), and B (blue) modulated according to image data. A part of the combined light, in which the three-color laser beams are combined, is guided to the reflection plane of the light deflector 15. The light deflector 15 is a micro-electromechanical system (MEMS) scanner produced by a semiconductor manufacturing process. The light deflector 15 includes a single micro-mirror that is independently rotatable about two perpendicular axes. In some embodiments, the light deflector 15 may be a combination of two MEMS scanners each with a micro-mirror that is rotatable about one axis. Examples of a scanner may include, but is not limited to, the MEMS scanner, a galvano scanner and a polygon scanner. The light-source unit 11 and the light deflector 15 will be described later in detail.

The light (some rays of the above-described combined light beam) according to image data output from the light-source unit 11 is deflected by the light deflector 15, and is reflected by the scanning mirror 20 while having the beam spread angle reduced by the scanning mirror 20. Thus, the light goes to the screen 30. Then, the screen 30 is optically scanned to form an intermediate image thereon. In that case, it is desired that the concave mirror 40 be designed and disposed so that the concave mirror 40 corrects the optical deformation in which the horizontal line of the intermediate image is distorted to be convex upward or downward due to the effect of the front window 50.

The light having passed through the screen 30 is reflected by the concave mirror 40 to travel to the front windshield 50. Some of light rays that enter the front window 50 permeate the front window 50, and at least some of the remaining light rays is reflected by the front window 50 toward the viewpoint position (the eye) of a viewer A. As a result, the viewer A can visually identify, through the front window 50, a virtual image Q that is an enlarged intermediate image. In other words, the viewer A identifies the enlarged and displayed virtual image Q through the front window 50.

In some embodiments, a combiner as the transmission and reflection member may be disposed closer to the viewpoint position of the viewer A than the front window 50 to receive light from the concave mirror 40, which allows displaying a virtual image in the same manner as in the configuration with only the front window 50 disposed.

Hardware Configuration of Control System of the HUD

Figure 2:
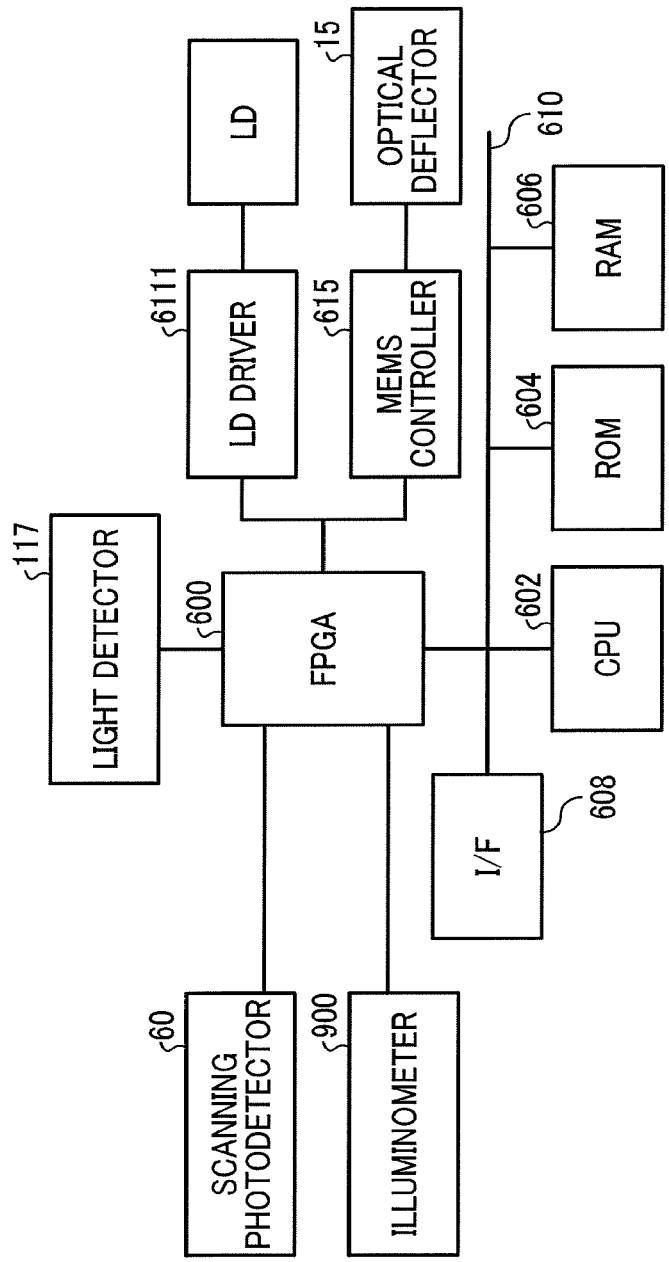
FIG. 2 is a block diagram of a hardware configuration of a control system of the HUD of FIG. 1.

FIG. 2 is a block diagram of a hardware configuration of the HUD 100. As illustrated in FIG. 2, the HUD 100 includes an field programmable gate array (FPGA) 600, a central processing unit (CPU) 602, a read-only memory (ROM) 604, a random access memory (RAM) 606, an interface (IF) 608, a bus line 610, a laser diode (LD) driver 6111, and a micro-electromechanical systems (MEMS) controller 615.

The FPGA 600 includes a LD control circuit 700 (shown in FIG. 6) and a light deflector control circuit. The LD control circuit 700 controls the LD driver 6111 to drive a LD to be described later based on image data, an output of an illuminometer 900, and an output of a scanning photodetector 60. The light-deflector control circuit controls the MEMS controller 615 to control a light deflector 15 based on image data, an output of an illuminometer 900, and an output of a scanning photodetector 60. The CPU 602 controls operation of the HUD 100. The ROM 604 stores an image processing program that is executed by the CPU 602 to control operation of the HUD 100. The RAM 606 is used as a working area in which the CPU 602 executes the program. The IF 608 is an interface to communicate with an external controller such as a controller area network (CAN) of a vehicle.

Functional Blocks of the HUD

Figure 3:
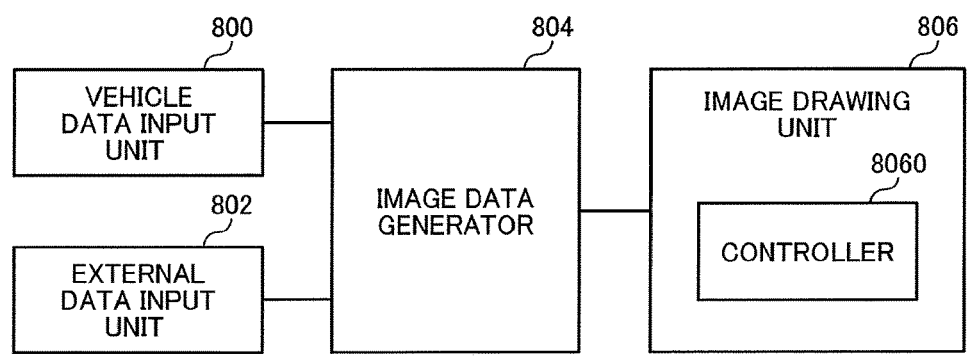
FIG. 3 is a functional block diagram of the HUD according to an embodiment of the present disclosure.

FIG. 3 is a block diagram of the HUD 100. As illustrated in FIG. 3, the HUD 100 includes a vehicle data input unit 800, an external data input unit 802, an image generator 804, and an imaging unit 806. The vehicle data input unit 800 receives vehicle-related data, such as the speed and mileage of the vehicle, the distance to a target, and the luminance of outside (environmental illuminance), from the CAN. The environmental illuminance refers to a measured value of the illuminometer 900 that measures the illuminance of the environment surrounding a vehicle on which the HUD 100 is mounted. The illuminometer 900 sends the environmental illuminance to the LD control circuit 700 of the FPGA 600. The external data input unit 802 receives external data, such as navigation information from the global positioning system (GPS), from the external network. The image generator 804 generates image data of an image to be drawn according to the data input from the vehicle data input unit 800 and the external data input unit 802, and sends the generated image data to a field programmable gate array (FPGA) 600. The imaging unit 806 includes a controller 8060 to send a control signal to control the FPGA 600 to start or end drawing an image.

Configuration of Light Deflector

Figure 4:
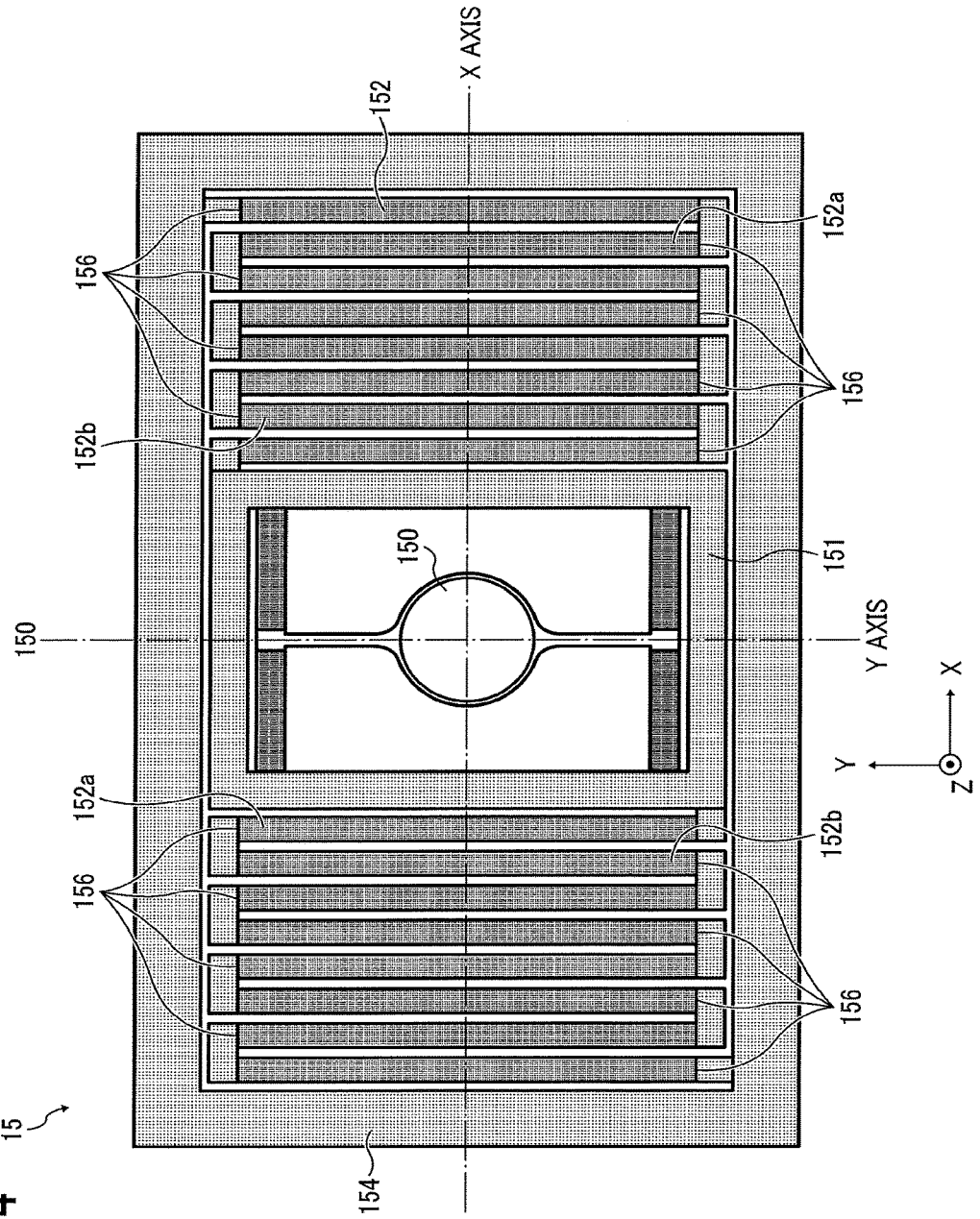
FIG. 4 is an illustration of a light deflector of the HUD according to an embodiment of the present disclosure.

FIG. 4 is an illustration of a configuration of the deflector 15. As illustrated in FIG. 4, the light deflector 15, which is a MEMS scanner produced by a semiconductor manufacturing process, includes a mirror 150 having a reflection plane and a plurality of bars arranged in an X-axis direction. The light deflector 15 further includes a pair of serpentine units 152 in which two adjacent beams are connected to form a meander geometry. The two adjacent beams of each serpentine unit 152 are a first beam and a second beam (152b). The beams are supported by a frame member 154. Each of the beams is provided with a plurality of piezoelectric materials 156 (for example, PZT (lead zirconate titanate)). Different voltages are applied to the piezoelectric member of the two adjacent beams in each serpentine unit 15. Accordingly, the two adjacent beams 152a and 152b bend in different directions. As elastic energy is accumulated in the bent portion, the mirror 150 rotates about the X axis (in the vertical direction) with a wide angle. Due to such a configuration, optical scanning where the vertical axis is the center of the X axis can be performed in the vertical direction with lower voltage. On the other hand, around the Y axis in the horizontal direction, the optical scanning with resonance is performed using, for example, a torsion bar that is connected to the mirror 150.

Figure 5:
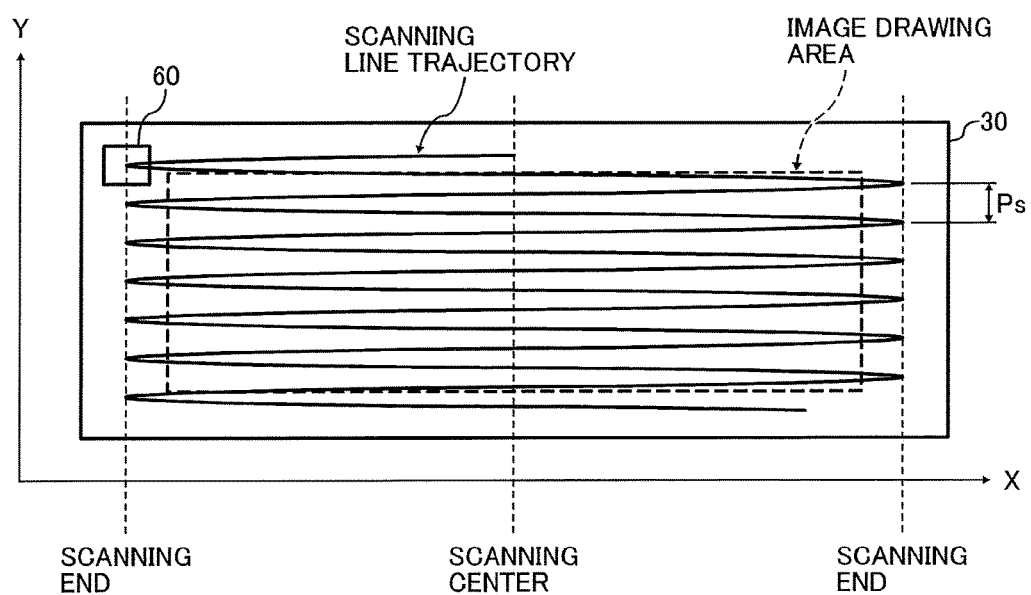
FIG. 5 is a diagram of an example of a trajectory of a scanning line when two-dimensional scanning is performed, according to an embodiment of the present disclosure.

The above-described configuration of the optical defector 15 allows a laser beam to two-dimensionally scan an imaging area of the screen 30 (for example, by raster scanning) (see FIG. 5) and allows drawing an image and displaying a virtual image for each pixel by controlling the light emission of the LD according to the scanning position of the laser beam. In FIG. 5, Ps is a scanning line pitch.

Optical Scanning and Virtual Image Display

Although the HUD 100 momentarily projects a dot image corresponding to a laser beam diameter, an afterimage within one frame image sufficiently remains in a human eye because of very-high-speed scanning. Such an afterimage phenomenon allows a driver to perceive the afterimage as an image projected onto an "image display area". In actuality, the image having been displayed on the screen 30 is reflected by the concave mirror 40 and the front windshield 50 and the image is perceived as a virtual image by a driver in the image display area. In such a mechanism, the light emission of the LD may be stopped when no image is displayed. In other words, the luminance can be substantially set to 0 for any place other than the place in which a virtual image is displayed in the image display area.

More specifically, the image-forming position of a virtual image formed by the HUD 100 is any position within the image display area in which the virtual image can be formed. Such an image display area is determined according to the design specifications for the HUD.

As described above, the laser scanning system is adopted in the present embodiment. This allows switching off the LD or reducing the amount of light of the LD for portions not to be displayed (hidden).

In the panel system, by contrast, in which an intermediate image is expressed by the imaging device, such as a liquid crystal display (LCD) and a digital micro-mirror device (DMD), completely hiding the images is difficult even in a black display mode For this reason, the properties of the LCD and the DMD in which the entire panel is illuminated. This causes misadjusted black level. However, the laser scanning system can prevent such a misadjusted black level (black floating).

As illustrated in FIG. 5, the scanning photodetector 60 is disposed in a peripheral area of an imaging area ("effective scanning area") in the screen 30. The scanning photodetector 60 detects the motion of the light deflector 15. Specifically, the scanning photodetector 60 detects the scanning timing (the scanning position of a laser beam) in response to light radiated onto a signal area, and controls a change in property of the light deflector with changes in environment and changes over time, thus maintaining a constant image quality. The scanning photodetector 60 according to the present embodiment includes a photodiode or a phototransistor. The scanning photodetector 60 outputs a signal (output signal) to the FPGA 600.

Light-Source Unit

Figure 6:
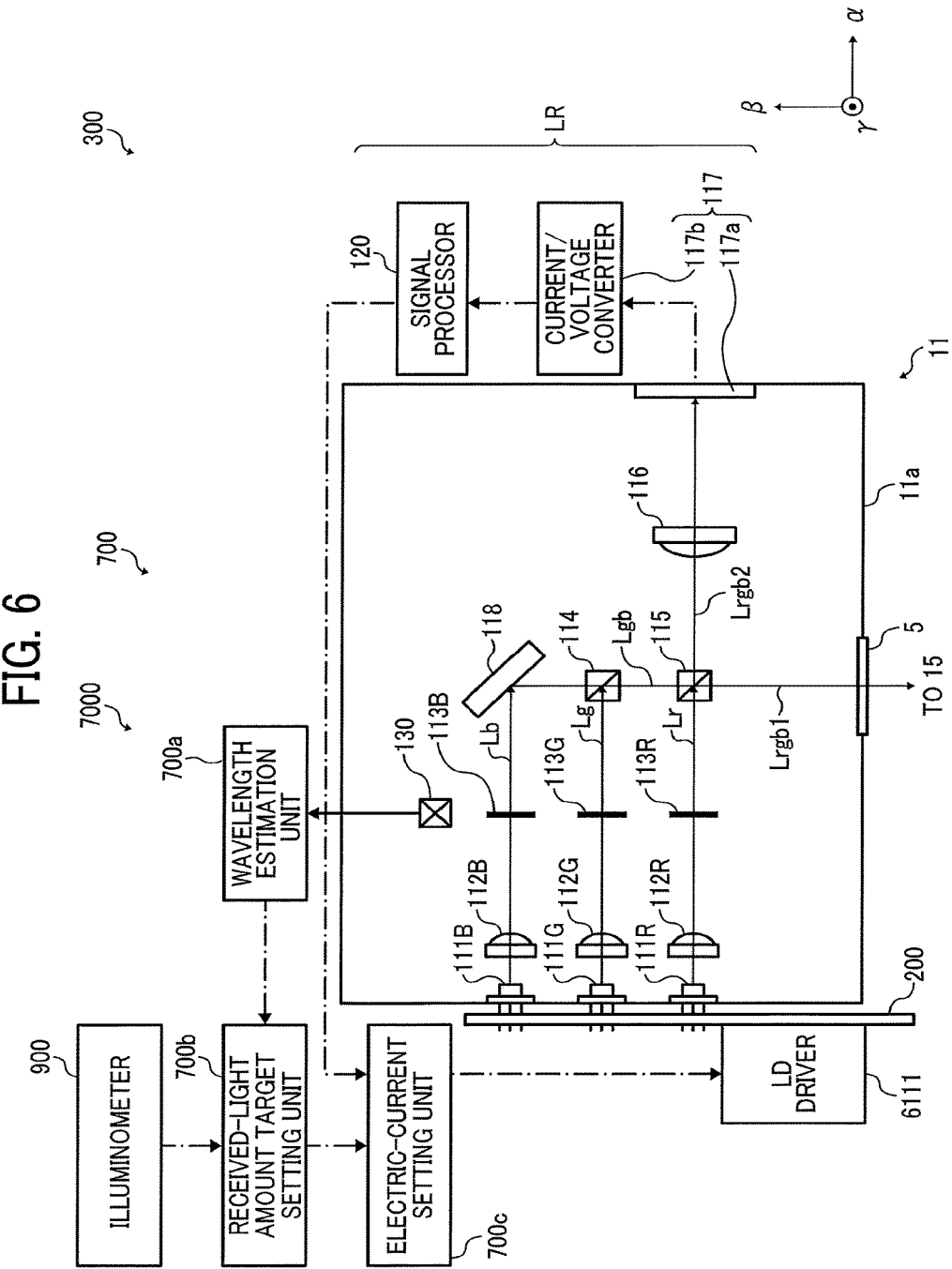
FIG. 6 is an illustration of a light-source device of the HUD according to an embodiment of the present disclosure.

The following describes the light-source unit 11 in detail. FIG. 6 is an illustration of a schematic configuration of the light-source unit 11. In the following description, an $\alpha\beta\gamma$ three-dimensional rectangular coordinate system as illustrated, for example, FIG. 6, is referred to where appropriate.

As illustrated in FIG. 6, the light-source unit 11 includes a plurality of light sources (for example, three light sources in the present embodiment) each including a semiconductor laser and a package that contains the semiconductor laser. The semiconductor laser has a single or a plurality of light-emitting points. The semiconductor lasers of the three light sources are referred to as a semiconductor laser 111R, a semiconductor laser 111B, and a semiconductor laser 111G.

Note that the laser beams R, G, and B emitted from the semiconductor lasers 111R, 111G, and 111B, respectively are modulated according to the image information (i.e., image data) of a "two-dimensional color image" to be displayed. This modulation may modulate the peak intensity of the laser beams emitted from the semiconductor lasers 111R, 111G, and 111B, i.e., power modulation or may modulate the pulse widths of the laser beams, i.e., pulse width (PW) modulation. The LD control circuit 700 controls the LD driver 6111 to perform such a modulation.

The light-source unit 11 includes, in addition to the three light sources (the light-emitting elements 111R, 111B, and 111G), a plurality of (for example, three) coupling lenses 112R, 112G, and 112B, a plurality of (for example, three) aperture members 113R, 113G, and 113B, an optical-path combining element 114, and optical-path branch element 115, a condenser lens 116, and a reflection mirror 118. Each constituent element of the light-source unit 11 is incorporated in a housing 11a.

Each semiconductor laser is an end-surface light-emitting semiconductor laser (LD) having a different oscillation wavelength bandwidth (light-emission wavelength bandwidth). More specifically, the semiconductor laser 111R is a semiconductor laser for the red color, and the semiconductor laser 111G is a semiconductor laser for the green color. The semiconductor laser 111B is a semiconductor laser for the blue color. In the present embodiment, each of the semiconductor lasers 111R, 111G, and 111B emits light in a $+\alpha$ direction (direction of light emission). Each of the semiconductor lasers 111R, 111G, and 111B is mounted on a circuit board 200 provided with the LD driver 6111.

Laser beams Lr, Lg, and Lb emitted from the LD 111R, 111G, and 111B pass through the respective coupling lenses 112R, 112G, and 112B to be coupled to a subsequent optical system.

The coupled laser beams Lr, Lg, and Lb are shaped by the respective aperture member 113R, 113G, and 113B. The aperture members may have various kinds of shapes such as a circle, an ellipse, a rectangle, and a square, according to the divergence angle of a laser beam.

The laser beam Lb having passed through the aperture member 113B is reflected by the reflecting mirror 118 toward a $-\beta$ direction and enters the optical-path combining element 114 (for example, a dichroic mirror).

The laser beam Lg having passed through the aperture member 113G enters the optical-path combining element 114 (for example, a dichroic mirror) to be combined with the laser beam Lb. More specifically, the laser beam Lb having passed through the reflection mirror 118 permeates through the center of the optical-path combining element 114 in the $-\beta$ direction. The laser beam Lg having passed through the aperture member 113G is reflected by the center portion of the optical-path combining element 114 toward the $-\beta$ direction.

The laser beam Lgb, in which the light beam Lg is combined with the laser beam Lb, is combined with the laser beam Lr having passed through the aperture member 113R at the optical-path branch element 115. Then, the laser beam combined at the optical-path branch element 115 separates into a transmitted light beam and a reflected light beam. In the present embodiment, the optical-path combining element 114 and the optical-path branch element 115 and the reflecting mirror 118 are separate elements. In some embodiments, at least two of these elements may be constituted as a single unit.

More specifically, some rays of the laser beam Lgb pass through the center portion of the optical-path branch element 115 toward the $-\beta$ direction, and the remaining rays of the laser beam Lgb is reflected by the center portion of the optical-path branch element 115 toward the $+\alpha$ direction. Some rays of the laser beam Lr having passed through the aperture member 113R is reflected by the center portion of the optical-path branch element 115 toward the $-\beta$ direction, and the remaining rays of the laser-beam bundle Lr pass through the center portion of the optical-path branch element 115 toward the $+\alpha$ direction.

In other words, an optical branching laser beam Lrgb1, in which the some rays of the combined laser beam Lgb are combined with the some rays of the laser beam Lr, travels toward the $-\beta$ direction, and a combined laser beam Lrgb2, in which the remaining rays of the combined laser beam Lgb are combined with the remaining rays of the laser beam Lr, travel toward the $+\alpha$ direction.

The housing 11a includes a light-transmission window 5 to surround and cover an opening in the housing 11a. The combined laser beam Lrgb1 is emitted toward the light deflector 15 through the light-transmission window member 5, and is used for drawing an image (displaying a virtual image) on the screen 30. Note that a meniscus lens having a concave surface toward the side of the light deflector 15 may be disposed between the optical-path branch element 115 and the light deflector 15.

The laser beams R, G, and B having passed through the optical-path branch element 115 in the $+\alpha$ direction pass through the condenser lens 116 and enter the light-receiving element 117a of the light detector 117. As the light-receiving element 117a, a photodiode (PD) or a phototransistor may be used. In addition to the light-receiving element 117a, the light detector 117 further includes a current-voltage converter 117b that converts the output current of the light-receiving element 117a into a voltage signal (received-light signal) and outputs the signal to a signal processing unit 120 as will be described later.

The signal processing unit 120 is disposed downstream of the current-voltage converter 117b to temporally average the received-light signal. The signal processing unit 120 adds up the received-light signals that have been input during a predetermined time period T to obtain the time-averaged amount of light (hereinafter, referred to also as "monitor light intensity Pmoni"), and temporally averages (divides by T) the sum, outputting the averaged value to the LD control circuit 700. Note that in some embodiments, the signal processing unit 120 may directly output the received-light signal sent from the current-voltage converter 117b to the LD control circuit 700.

As is apparent from FIG. 6, the optical path length between each semiconductor laser and the optical-path branch element 115 differs for each light-emitting element. More specifically, the optical-path length between the semiconductor laser 111B and the optical-path branch element 115 is the longest, and the optical-path length between the semiconductor laser 111R and the optical-path branch element 115 is the shortest. This is because a great amount of red light and a small amount of blue light are used to form a white color in a virtual image where a ratio of combination of RGB (red, green, and blue) is approximately 2.5:1:0.5. This configuration prevents a reduction in utilization efficiency of light of the semiconductor laser.

The LD control circuit 700 generates a modulating signal (a pulse signal) for each semiconductor, and sends the modulating signal to the LD driver 6111. The LD driver 6111 applies a drive current according to the modulating signal for each semiconductor laser to the corresponding semiconductor laser.

Hereinafter, the device including the light-source unit 11, the light detector 117, and the LD control circuit 700 are referred to as a light-source device 300.

Here, a description is given on the assumption that a desired color is provided for each pixel of a virtual image Q, that is, desired colored light is generated. The color may be expressed by numbers using an xy chromaticity coordinate system. Formula (2) below is established using the tristimulus value matrix H, which is defined by the wavelengths $\lambda(R)$, $\lambda(G)$, and $\lambda(B)$ of the laser beams emitted from the semiconductor lasers 111R, 111G, and 111B, and the balance (power balance) between beam power $\omega(R)$, beam power $\omega(G)$, and beam power $\omega(B)$ in the virtual image Q (hereinafter, referred to also as power balance $\omega(R)$, $\omega(G)$, and $\omega(B)$).

[Formula 2]

$$\begin{pmatrix} x \\ y \\ 1-x-y \end{pmatrix} = H \begin{pmatrix} \omega^{(R)} \\ \omega^{(G)} \\ \omega^{(B)} \end{pmatrix} \quad (2)$$

Accordingly, the power balance to generate the desired color is obtained by formula (3) below.

[Formula 3]

$$\begin{pmatrix} \omega^{(R)} \\ \omega^{(G)} \\ \omega^{(B)} \end{pmatrix} = H^{-1} \begin{pmatrix} x \\ y \\ 1-x-y \end{pmatrix} \quad (3)$$

In actuality, computing such a value for each color is very time consuming, and therefore it is preferable to perform such a computation only for reference color. In particular, when the reference color is defined as white color, other colors other than the white color are expressed by combining the gradation levels of the LD light intensities PLD (light-emission amounts), i.e., the intensities of light beams emitted from the respective semiconductor lasers 111R, 111G, and 111B. This configuration facilitates the process for generating any colored light.

In the xy chromaticity coordinate system, the white color is expressed by (x, y)=(1/3, 1/3), which may be determined by sensory evaluation. Actually, hue differs between races, and accordingly more preferable white color may be designated as the reference color. In the present embodiment, (x, y)=(1/3, 1/3) is adopted for the white color as the reference color. Accordingly, formula (4) is obtained by assigning the values of x and y in formula (3).

[Formula 4]

$$\begin{pmatrix} \omega^{(R)} \\ \omega^{(G)} \\ \omega^{(B)} \end{pmatrix} = H^{-1} \begin{pmatrix} 1/3 \\ 1/3 \\ 1/3 \end{pmatrix} \quad (4)$$

To generate the reference color (white), the LD light intensity PLD, i.e., the intensities (light-emission amount) of the light beams emitted from the semiconductor lasers 111R, 111G, and 111B are set to obtain the power balance between beam power $\omega(R)$, beam power $\omega(G)$, and beam power $\omega(B)$ obtained by the above-described formula (4). As a matter of course, if the light utilization efficiency $\eta$main of all the optical elements disposed in the optical paths from each semiconductor laser to the front windshield 50 is known, the relation: PLD(R):PLD(G):PLD(B)=$\omega$(R)/$\eta$main(R):$\omega$(G)/$\eta$main(G):$\omega$(B)/$\eta$main(B) is established. Thus, the LD light intensities PLD(R), PLD(G), and PLD(B) are easily set in a direct manner.

However, since the light deflector 15 scans the virtual image Q with a light beam and the screen 30 causes the light beam to spatially spread, it is difficult to obtain the light utilization efficiency $\eta$main in advance.

For the similar reason that the screen 30 causes the light beam to spatially spread, it is impossible to adopt the method in which a light-receiving element is disposed near the front windshield 50 to directly measure the power balance between the semiconductor lasers and the measured data is fed back to each semiconductor laser.

Hence, the present inventor has conceived of the following method for setting a target value of the amount of light (i.e., monitor light intensity Pmoni of a light-receiving system LR) received by a light-receiving system LR that includes the light detector 117 and the signal processing unit 120 to handle the above-described circumstances.

As described above, the HUD 100 allows the signal processing unit 120 to obtain the monitor light intensity Pmoni. As a matter of course, since the monitor light intensity Pmoni varies with the amount of the current applied to each semiconductor laser 111, the set values of the LD light intensities PLD(R), PLD(G), and PLD(B) are not directly obtained such that the balance between the beam power $\omega(R)$, the beam power $\omega(G)$, and the beam power $\omega(B)$ are obtained. Instead, the set values of the monitor light intensities Pmoni(R), Pmoni(G), and Pmoni(B) are obtained such that the above-described power balance ω(R), ω(G), and ω(B) is obtained.

In other words, obtaining the set values of the monitor light intensities Pmoni (R), Pmoni(G), and Pmoni (B) to obtain the above-described power balance ω(R), ω(G), and ω(B) enables obtaining desired set values of the LD light intensities PLD(R), PLD(G), and PLD(B), i.e., the amount of light emitted from the semiconductor lasers 111R, 111G, and 111B by setting the current amount applied to the semiconductor lasers 111R, 111G, and 111B according to the target values i.e., the obtained set values of monitor light intensities Pmoni(R), Pmoni(G), and Pmoni(B).

When colored light of the reference color is generated under a certain condition in an initial adjustment process before the shipping of the HUD 100, power balance ω0(R), ω0(G), and ω0(B) and monitor light intensity P(0)moni(R), P(0)moni(G), and P(0)moni(B) are obtained. With these values, the ratio between monitor light intensities Pmoni(R), (G), and (B) under any conditions are obtained using formula (5) below:

$$Pmoni(R):Pmoni(G):Pmoni(B)=\omega(R)/\omega0(R)*Pmoni(R):\omega(G)/\omega0(G)*Pmoni(G):\omega(B)/\omega0(B)*Pmoni(B) \quad (5).$$

The above-described formula (5) is used because the oscillation wavelength of the semiconductor laser (the wavelength of light emitted from each semiconductor laser) varies with the ambient temperature of the device and thereby the tristimulus value coordinate H also changes.

Thus, the power balance ω(R), ω(G), and ω(B) obtained by the above-described formula (4) changes with the ambient temperature of the device. Such a change in the power balance ω(R), ω(G), and ω(B) is timely corrected to prevent the color of the virtual image Q from changing.

Figure 7:
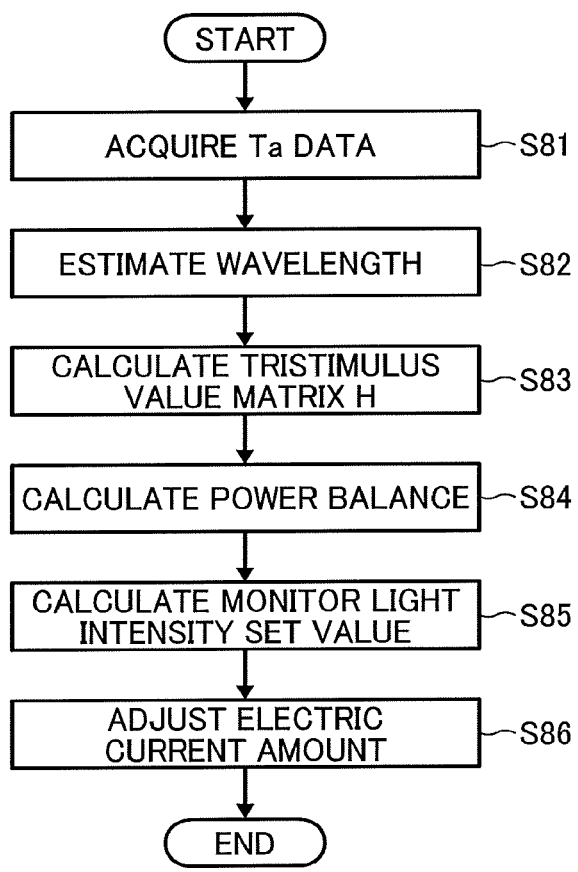
FIG. 7 is a flowchart of processing in which Ta data is first acquired and the amount of the current is finally adjusted.

The power balance ω0(R), ω0(G), and ω0(B), which is obtained at the ambient temperature, e.g., Ta(0) of 25° C. in the initial adjustment, is different from the power balance ω(R), ω(G), and ω(B) at any ambient temperature Ta (however, when Ta is the same as Ta(0), the power balance ω0(R), ω0(G), and ω0(B) is the same as the power balance ω(R), ω(G), and ω(B)). In short, the set values of the monitor light intensities Pmoni(R), (G), and (B) are preferably obtained using the above-described formula (5) (refer to FIG. 7). FIG. 7 is a flowchart of the processing in which Ta data is acquired (S81) and the amount of the current applied to each semiconductor laser is adjusted (S86). The wavelength estimation unit 700a acquires Ta data in step S81, and estimates the wavelength of light based on the acquired Ta data in step S82. The wavelength estimation unit 700a calculates calculating a tristimulus value matrix H in step S83, and calculates power balance in step S84. The monitor light-intensity setting unit 700b calculates a set value of Monitor light intensity based on the calculation results of the wavelength estimation unit 700a in step S85. The electric-current setting unit 700c adjusts electric-current amount in step S86.

In the initial adjustment, the power balance ω(R), ω(G), and ω(B) and the monitor light intensities Pmoni(R), (G), and (B) are preferably obtained under the following conditions: (a) each of the semiconductor lasers 111R, 111G, and 111B continuously emits light and (b) the grade scale is maximum. This is clearly because, when the reference color is, for example, the white color, any other colors are expressed by combining the color scales of the LD light intensities PLD (the amounts of light emitted from the respective semiconductor lasers 111R, 111G, and 111B).

In the present embodiment, the gradation level ranges from 1 to 256, i.e., a 256-grade on a color scale. The initial adjustment is performed at the 256th level that is maximum.

At the 256th level of color scale, the luminance of the virtual image Q is maximum. The luminance of the virtual image Q is preferably set for the assumed maximum luminance of external light so as to display a visually comfortable image (the virtual image Q) for a viewer A. Such an assumed maximum luminance of external light is obtained from sunlight reflected from snow. Under such a condition, setting the luminance of approximately 10000 candela (cd)/m2 allows displaying a visually comfortable virtual image Q for the viewer A. In the present embodiment, this luminance value (approximately 10000 cd/m2) is defined as the reference luminance L(0).

More specifically, the amount of the current applied to each semiconductor laser is adjusted such that the luminance of the virtual image Q is the reference luminance L(0) of 10000 cd/m2 and the reference color is the white color, in the initial adjustment process. In such an initial adjustment process, the monitor light intensities P(0)moni(R), P(0)moni(G), and P(0)moni(B) are obtained according to the received-light signals of the light detector 117. In addition, the power balance ω0(R), ω0(G), and ω0(B) of the virtual image Q is obtained. Note that, the power balance ω0(R), ω0(G), and ω0(B) is obtained from the wavelengths λ(R), λ(G), and λ(B) of the laser beams emitted from the semiconductor lasers 111R, 111G, and 111B and the xy chromaticity coordinate of the white color as the reference color, using the above-described formula (4). The method for obtaining the wavelengths λ(R), λ(G), and λ(B) will be described below.

Note also that, the above-described formula (5) defines the ratio between the monitor light intensities Pmoni(R), Pmoni(G), and Pmoni(B) under any conditions, and the actual monitor light intensities Pmoni(R), Pmoni(G), and Pmoni(B) are expressed by formulas (6-1), (6-2), and (6-3) below using positive integer m.

$$Pmoni(R)=m*\omega(R)/\omega0(R)*P(0)moni(R) \quad (6\text{-}1);$$

$$Pmoni(G)=m*\omega(G)/\omega0(G)*P(0)moni(G) \quad (6\text{-}2);\text{ and}$$

$$Pmoni(B)=m*\omega(B)/\omega0(B)*P(0)moni(B) \quad (6\text{-}3).$$

The symbol "m" in formulas (6-1), (6-2), and (6-3) is determined by adjusting the amount of the current applied to each of the semiconductor lasers 111R, 111G, and 111B such that the resultant virtual image Q has the reference luminance L(0) of 10000 cd/m2 while maintaining the ratio between the monitor light intensities Pmoni(R), Pmoni(G), and Pmoni(B) obtained by the above-described formula (5).

As described above, the monitor light intensity Pmoni corresponds to the 256th level. To further obtain a monitor light intensity Pmoni at each level of the color scale, formulas (7-1), (7-2), and (7-3) below are used for the red color, the green color, and the blue color, respectively where Pmoni(R) 256, Pmoni(G) 256, and Pmoni(B) 256 refer to the monitor light intensities obtained by the above-described formulas (6-1), (6-2), and (6-3), respectively, g refers to a level of the color scale, and γ refers to a gamma value.

$$Pmoni(R)g=(g/256)\gamma*Pmoni(R)256 \quad (7\text{-}1);$$

$$Pmoni(G)g=(g/256)\gamma*Pmoni(G)256 \quad (7\text{-}2);\text{ and}$$

$$Pmoni(B)g=(g/256)\gamma*Pmoni(B)256 \quad (7\text{-}3).$$

Note that the value of γ is typically 2.2 in the HUD 100.

The luminance of the external light changes with the environmental conditions, such as the weather (fair weather, cloudy weather, rain, or snow), hours (daytime or nighttime), and a location such as whether the light travels indoor such as in the tunnel. Accordingly, the luminance of the virtual image Q is preferably changed according to the luminance of the external light.

When the assumed luminance of the external light is divided into 50 grades ranging from the minimum value $L_{external}$ (Min) to the maximum value $L_{external}$ (Max), the luminance of the virtual image Q corresponding to each external light luminance is unambiguously rated on a 50-grade scale under the condition that the virtual image Q displayed is a visually comfortable image for a viewer A.

As described above, the power balance ω(R), ω(G), and ω(B) and the monitor light intensities Pmoni(R), (G), and (B) are preferably obtained under the condition that (a) each of the semiconductor lasers 111R, 111G, and 111B continuously emits light, in the initial adjustment. Accordingly, the LD control circuit 700 controls the LD driver 6111 to modulate the peak intensity of each semiconductor (111R, 111G, and 111B), i.e., the power modulation, or modulate the pulse width of each semiconductor (111R, 111G, and 111B), i.e., the PW modulation, or perform the combination of the power modulation and the PW modulation to reduce the time-averaged LD light intensity PLD (average light intensity), which thus achieves rating the virtual image Q on a 50-grade scale.

In any case, between the power modulation and the PW modulation, the rate (%) of light intensity to be reduced in performing the power modulation or the rate (%) of duty to be set in performing the PW modulation is preliminarily determined to achieve the luminance rated on a 50-grade scale.

More specifically, the look-up table that represents the relation between the luminance of the external light and the amount of light emission (the LD light intensity PLD) of each semiconductor laser (111R, 111G, and 111B) is stored in the memory, such as the ROM 604 or the RAM 606 in FIG. 2. The HUD 100 reads out the LD light intensity PLD corresponding to the actual luminance of the external light, referring to the look-up table in FIG. 8, thereby to calculate the rate (%) of the average light intensity (the time-averaged LD light intensity PLD) to be reduced in the continuous emission of light. Note that the illuminometer 900, which measured the luminance (illuminance) of the surrounding environment of a vehicle equipped with the HUD 100, obtains the luminance of the external light. Note that examples of the memory may include, for example, a flash memory and a hard disk. In some embodiments, the memory may be disposed on, for example, the circuit board 200.

The monitor light intensity in view of the amount to be reduced is obtained by formulas (8-1), (8-2), and (8-3) below where Pmoni(R)Max, Pmoni(G)Max, and Pmoni(B) Max denote the monitor light intensities obtained from the above-described formulas (6-1), (6-2), and (6-3), respectively and d denotes the amount to be reduced:

$$Pmoni(R)d = d \cdot Pmoni(R)Max \qquad (8\text{-}1),$$

$$Pmoni(G)d = d \cdot Pmoni(G)Max \qquad (8\text{-}2), \text{ and}$$

$$Pmoni(B)d = d \cdot Pmoni(B)Max \qquad (8\text{-}3).$$

As described above, such a monitor light intensity Pmoni corresponds to the 256th level on the scale. To further obtain a monitor light intensity Pmoni at each level of the color scale, the following operation is performed.

The monitor light intensities Pmoni (R)d, g, Pmoni(G)d, g, and Pmoni(B)d, g in view of the amount d to be reduced and the level g on the color scale are obtained by formulas (9-1), (9-2), and (9-3) below where Pmoni(R)d, 256, Pmoni (G)d, 256, and Pmoni(B)d, 256 denote the monitor light intensities obtained from the above-described formulas (8-1), (8-2), and (8-3), respectively, d denotes the amount to be reduced, and g refers to a level of the color scale:

$$Pmoni(R)d,g = (g/256)\gamma Pmoni(R)d,256 \qquad (9\text{-}1);$$

$$Pmoni(G)d,g = (g/256)\gamma Pmoni(G)d,256 \qquad (9\text{-}2); \text{ and}$$

$$Pmoni(B)d,g = (g/256)\gamma Pmoni(B)d,256 \qquad (9\text{-}3).$$

Note that the value of d is common between the above-described formulas (9-1), (9-2), and (9-3) irrespective of the luminance of the external light, and the value of g is common or differs according to color data for each pixel of image data between the above-described formulas (9-1), (9-2), and (9-3).

Note also that the monitor light intensity (Pmoni(R), Pmoni(G), and Pmoni(B)) obtained under any desired conditions is a function of (a) the power balance ω0(R), ω0(G), and ω(B) and the monitor light intensity P(0)moni(R), P(0)moni(G), and P(0)moni(B) obtained in the initial adjustment (obtained under a certain condition when colored light of the reference color is generated) and (b) the power balance ω(R), ω(G), and ω(B) obtained under any desired condition.

Further, the power balance is a function of the oscillation wavelength as can be seen from the above-described formula (4), and the oscillation wavelength is a function of the ambient temperature. Accordingly, a list of the power balance ω(R), ω(G), and ω(B) for each ambient temperature Ta is preliminarily formed. Thus, when (a) the power balance ω0(R), ω0(G), and ω0(B) and the monitor light intensity P(0)moni(R), P(0)moni(G), and P(0)moni(B) are obtained in the initial adjustment, the list of the monitor light intensities Pmoni(R), Pmoni(G), and Pmoni(B) for each ambient temperature Ta and for each luminance level of the external light is generated in advance using the above-described formulas (6-1) through (9-3).

The generated list is stored as the look-up table in the memory, which allows reading out the monitor light intensities Pmoni(R), Pmini(G), and Pmoni(B) (target values of the monitor light intensities) to be set based on the actual amount of light emission of the semiconductor lasers 111R, 111G, and 111B (equivalent to the actual luminance of the external light) and the ambient temperature.

Using the look-up table enables determining the monitor light intensity to be set by reading out data, which allows precisely adjusting the luminance of colored light in real time. However, this way of determining the monitor light intensity depends on the capacity of the memory.

When the capacity of the memory is insufficient, the processes using the above-described formulas (6-1) through (9-3) are to be performed for each time at which the condition changes. However, such a process is performed during the generation of a virtual image Q. Accordingly, any delay due to such a process performed does not give a visually-uncomfortable image to a viewer A although setting a value by performing such a process is not as timely as the case in which a value is set by using the look-up table.

The process of adjusting the amount of electric current to be applied to each semiconductor laser 111R, 111G, and 111B is performed during a time period of scanning other areas other than the imaging area and during the transition time between the continuous frames around the time period of scanning other areas, so as to obtain the monitor light intensity of the set value (see FIG. 5).

In such a process (adjusting the amount of electric current to be applied to each semiconductor laser 111R, 111G, and 111B) as well, the relation between the amount of electric current and the monitor light intensity is preliminarily obtained, and the look-up table representing the relation is prepared. In such a case, the luminance of a virtual image Q can be set to a desired value more timely. However, reading data regarding the time-averaged LD light intensity PLD from the look-up table stored in the memory has a greater risk in view of time degradation. For such a reason, an appropriate method for adjusting the amount of electric current to be applied to each semiconductor 111R, 111G, and 111B is preferably adopted to precisely determine the amount of electric current to obtain a desired monitor light intensity Pmoni.

The temperature sensor in FIG. 6 detects the temperature data. The temperature sensor 130 is preferably disposed at a position that enables obtaining the ambient temperature of the semiconductor lasers 111R, 111G, and 111B.

In the present embodiment, the temperature sensor 130 is disposed near the aperture member 113B that is separated from each semiconductor laser in the housing 11a as an example. In some embodiments, the temperature sensor 130 may be disposed near another aperture member (113G or 113R), the reflection mirror 118, the optical-path combining element 114, the optical-path branch element 115, or the condenser lens 116. In any case, the temperature sensor 130 is preferably disposed at a position within an appropriate distance range from each semiconductor laser to detect the ambient temperature of the semiconductor laser.

The temperature sensor 130 may be capable of detecting the ambient temperature of the semiconductor lasers 111R, 111G, and 111B, and examples of the temperature sensor 130 include a thermocouple, a thermistor, a resistance temperature detector, and a radiation thermometer.

In some embodiments, a different temperature sensor (hereinafter, referred to as a "package temperature sensor") may monitor a package temperature Tpk that is the temperature of the package housing the semiconductor laser, instead of detecting the ambient temperature by the temperature sensor 130. This allows extracting (detecting) the ambient temperature of the semiconductor lasers 111R, 111G, and 111B. The package temperature sensor may be a contact type or a non-contact type. When Tpk is the package temperature, Ta is the ambient temperature, and TLD is the temperature of the semiconductor laser (hereinafter referred to also as the semiconductor laser temperature), the relation of Tpk=Ta+TLD is satisfied. Thus, the package temperature Tpk is obtained by adding the semiconductor laser temperature TLD to the ambient temperature Ta.

In this case, the semiconductor laser temperature TLD depends on the ratio of the time period of pulse oscillation relative to the cycle of the pulse oscillation, i.e., a duty ratio.

Accordingly, the semiconductor laser temperature TLD according to the duty ratio of a semiconductor laser is preliminarily written for each color in the firmware of the LD control circuit 700. The semiconductor laser temperature TLD is read out from the firmware based on the pulse oscillation information (the duty ratio of the semiconductor laser for each color) when the package temperature Tpk is obtained. Then, the ambient temperature Ta is obtained by subtracting the semiconductor laser temperature TLD from the package temperature Tpk. In this case, the ambient temperature Ta is not needed to be obtained by subtracting the semiconductor laser temperature TLD from the package temperature Tpk for all of the semiconductor lasers. Instead, the ambient temperature Ta may be obtained by the above-described calculation for at least one of the semiconductor lasers. However, errors in Tpk−TLD might occur between semiconductor lasers. Accordingly, it is preferable that Ta is obtained by Tpk−TLD for a plurality of semiconductor lasers, and the average value or the center value of the obtained values of Ta is adopted.

With the semiconductor laser switched off (i.e., the duty ratio is 0%), the semiconductor laser temperature TLD is the lowest. With the semiconductor laser that has continuously emitted light (the duty ratio is 100%), the semiconductor laser temperature TLD is the highest. The changes in semiconductor laser temperature with the duty ratio are assumed to have linearity.

In the present embodiment, the temperature TLD of the semiconductor laser that is switched off and the temperature TLD of the semiconductor that has continuously emitted light is written for each color in the firmware of the LD control circuit 700, and the semiconductor laser temperature TLD for when the package temperature Tpk is measured may be obtained based on the duty ratio. In this case as well, the semiconductor laser temperature TLD may be obtained for at least one semiconductor laser for the same reason as described above.

Further, the semiconductor laser temperature TLD is typically 0° C. with the semiconductor laser switched off (the duty ratio is 0%). In view of this, only the temperature TLD of the semiconductor laser that has continuously emitted light is preliminarily written in the firmware of the LD control circuit 700. Then, the semiconductor laser temperature TLD when the package temperature Tpk is measured may be calculated based on the duty ratio, using the temperature TLD of the switched-off semiconductor laser of 0° C. In this case as well, the semiconductor laser temperature TLD may be obtained for at least one semiconductor laser for the same reason as described above.

The above-described detection of the ambient temperature Ta by monitoring the package temperature Tpk is performed by a detector. The detector includes the package temperature sensor, a duty-ratio acquisition unit to acquire the duty ratio of the semiconductor laser, the above-described firmware, and a calculator to calculate the value of Tpk−TLD.

Preferably, the wiring length between the LD driver 6111 and the semiconductor laser is relatively short to speed up the pulse oscillation of the semiconductor laser. This, however, might cause the heat generated by the drive of the LD driver 6111 to propagate to a ground layer of the circuit substrate 200, thus further increasing the temperature TLD of the semiconductor laser. In this case, the temperature Tpk of a package that contains the semiconductor laser is a temperature in which the temperature components of the ambient temperature Ta, the semiconductor laser temperature TLD, and the temperature TIC of the LD driver 6111 are combined. That is, the package temperature Tpk is obtained by adding the ambient temperature Ta, the semiconductor laser temperature TLD, and the temperature TIC of the LD driver 6111 together (Tpk=Ta+TLD+TIC).

When the LD driver 6111 is shared among the semiconductor lasers for the respective colors, the LD driver 6111 preferably drives, for example, only the semiconductor laser for the red color to emit light and maintains the other semiconductor lasers for the remaining colors switched off. That is, when the LD driver 6111 is common between the semiconductor lasers, any cases other than the effect on the duty ratios are preferably considered. Further, the effects of the temperature TIC of the LD driver 6111 are preferably considered for a method of extracting the ambient temperature Ta from the temperature Tpk of the package that contains a semiconductor laser.

The following describes the process of setting the amount of electric current to obtain the monitor light intensity obtained by calculation or read out from the look-up table. The process of setting the amount of electric current is performed during, for example, the time period of scanning an area other than the imaging area as illustrated in FIG. 5.

The amount of electric current is set for each color R, G, and B. For example, the amount of electric current I (R) is adjusted to obtain a determined monitor light intensity Pmoni (R), and subsequently the amount of electric current I (G) is adjusted to obtain a determined monitor light intensity Pmoni (G). Subsequently, the amount of electric current I (B) is adjusted to obtain a determined monitor light intensity Pmoni I (B).

Figure 10:
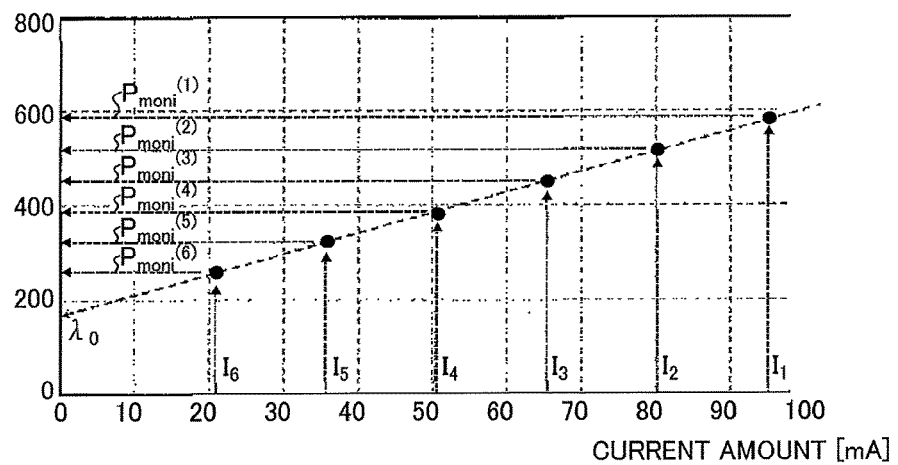
FIG. 10 is a graph of the relation of the amount of electric current applied to a semiconductor laser and monitor light intensity.

As illustrated in FIG. 10, the amount of electric current to be applied to each semiconductor laser is changed to 11, 12, . . . 15, and 16 in sequence, to obtain monitor light intensity Pmoni(1), monitor light intensity Pmoni(2), . . . monitor light intensity Pmoni(5), and monitor light intensity Pmoni(6), respectively. Note that a time-averaged integrated value of received-light signals, which are equivalent to the above-described monitor light intensity Pmoni(1), monitor light intensity Pmoni(2), . . . monitor light intensity Pmoni(5), and monitor light intensity Pmoni(6), is actually obtained.

When the amount of electric current applied to a semiconductor laser is greater than a threshold value of electric current of oscillation, the amount of electric current to be applied and the LD light intensity (or monitor light intensity instead of the LD light intensity) linearly change. Accordingly, linearly interpolating the plot in FIG. 10 can obtain the amount of electric current to be applied to a semiconductor laser to obtain desired monitor light intensity Pmoni.

As described above, the power balance ω(R), ω(G), and ω(B) is determined only by wavelengths (oscillation wavelengths) of light beams emitted from the semiconductor lasers 111R, 111G, and 111B. This means that such a wavelength is to be accurately measured or estimated.

A superheterodyne that utilizes an optical band-pass filter is known in the art as the method for measuring wavelengths of light emitted from the semiconductor lasers. However, using the superheterodyne method complicates the mechanism of the HUD and increases the size of the HUD.

To handle such a circumstance, the present inventors have paid attention to the fact that the temperature dependence of the oscillation wavelength is linear irrespective of the type of semiconductor laser, and have found that using this property of the oscillation wavelength can enable accurate estimation of the wavelength of light emitted from the semiconductor laser.

Note that the "wavelength" in the present disclosure refers to a weighted mean wavelength defined as follows unless otherwise mentioned.

Figure 11:
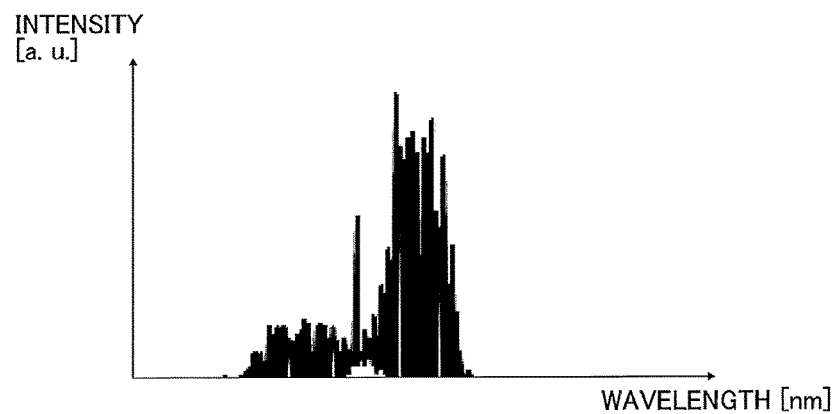
FIG. 11 is a map of a spectrum semiconductor laser that oscillates in a multi-longitudinal mode.

FIG. 11 is a spectrum map of a high-power semiconductor laser that oscillates in a multi-longitudinal mode. It is extremely difficult to determine the wavelength (the estimation target wavelength and the oscillation wavelength) of light emitted from a semiconductor laser having such a spectrum distribution in the oscillation wavelength bandwidth as described in FIG. 11, unlike the semiconductor laser that oscillates in a single-longitudinal mode.

However, the present inventors have found that power balance very strongly correlates with colored light generation based on the estimation target wavelength in generating desired colored light for displaying a virtual image in the HUD. In this case, the estimation target wavelength is defined as a wavelength obtained by weighted-averaging wavelength components having intensities ranging from Id through −20 decibel (dB) in the multi-longitudinal mode, where Id is the value of the peak intensity. With a wavelength component having an intensity less than the intensity of −20 dB relative to the peak intensity (Id), errors in colored light generation can be ignored. With the weighted-average wavelength, measuring wavelength is easy because there is no need to obtain the chromatic coordinate of a semiconductor laser same as in the dominant wavelength that is adopted in light-emitting diodes (LEDs).

By contrast, in the semiconductor laser that oscillates in the single-longitudinal mode, a single-spectrum wavelength itself is a target wavelength for estimation (estimation target wavelength).

The following describes the temperature dependence of the oscillation wavelength (the temperature dependence of light emitted from the semiconductor laser) in detail.

Figure 12:
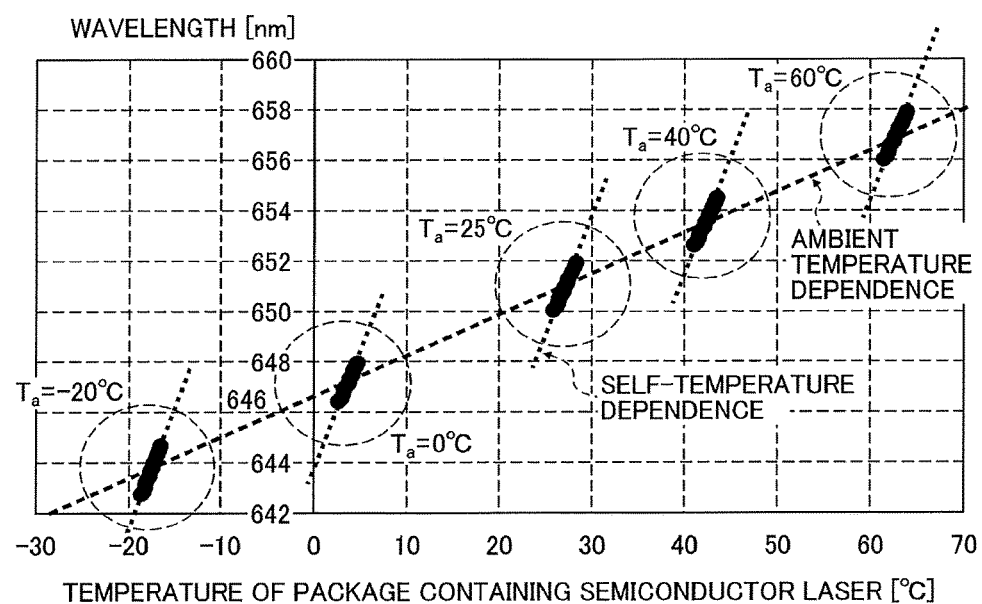
FIG. 12 is a graph of self-temperature dependence and ambient temperature dependence of wavelengths of light emitted from a semiconductor laser for red color.
Figure 13:
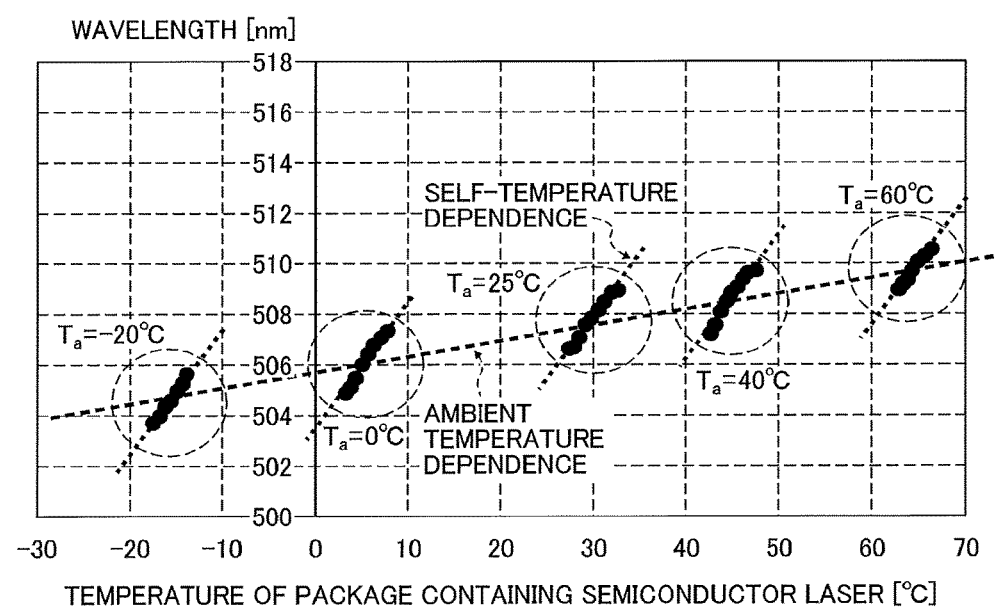
FIG. 13 is a graph of self-temperature dependence and ambient temperature dependence of wavelengths of light emitted from a semiconductor laser for green color.
Figure 14:
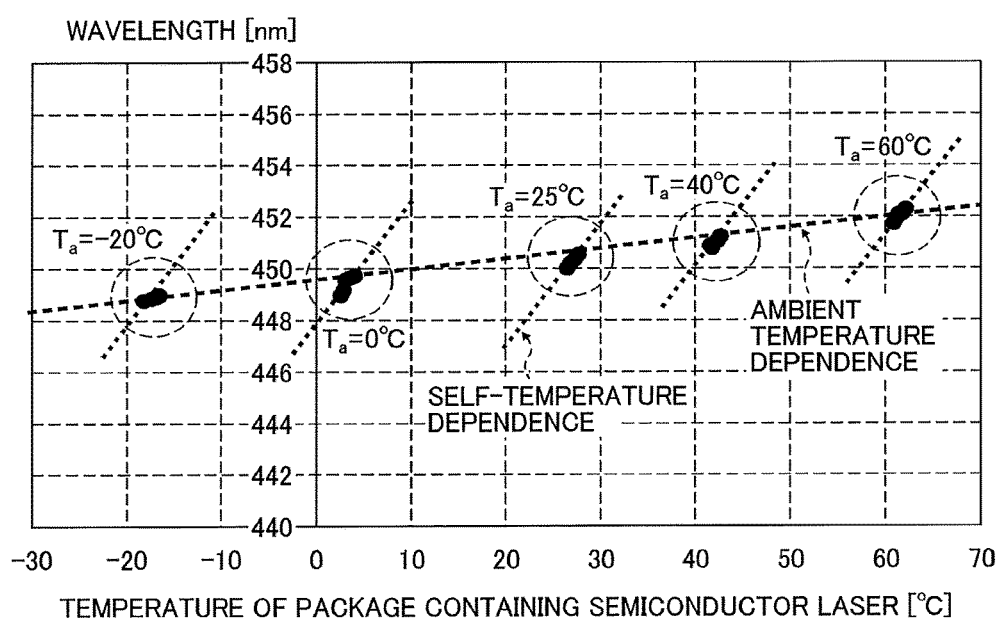
FIG. 14 is a graph of self-temperature dependence and ambient temperature dependence of wavelengths of light emitted from a semiconductor laser for blue color.

FIG. 12 is an illustration of the relations between the actual measured values of an oscillation wavelength and the temperatures of a package containing a semiconductor laser with the oscillation wavelength of the design value of 653 nm (red color). FIG. 13 is an illustration of the relations between the actual measured values of an oscillation wavelength and the temperatures of a package containing a semiconductor laser with the oscillation wavelength of the design value of 515 nm (green color). FIG. 14 is an illustration of the relations between the actual measured values of an oscillation wavelength and the temperatures of a package containing a semiconductor laser with the oscillation wavelength of the design value of 453 nm (blue color). It can be found from FIGS. 12 through 14 that the temperature dependence of oscillation wavelength has two types irrespective of the types of a semiconductor laser. The two types are (1) the ambient temperature dependence that is a dependence on the ambient temperature of the semiconductor laser and (2) the self-temperature dependence that is a dependence on self-heating according to the amount of self-light emission.

These two types of temperature dependence are preferably used to accurately estimate the wavelength (oscillation wavelength) of light emitted from the semiconductor laser. More specifically, the wavelength λ of a light beam emitted from a semiconductor laser (111R, 111G, or 111B) is expressed by formula (10) below:

$$\lambda = \lambda(0) + \alpha \times (Ta \times Ta(0)) + \beta \times (PLD - P(0)LD) \quad (10)$$

where
$\lambda(0)$ is the reference wavelength,
$\alpha$ is temperature coefficient,
Ta is the current ambient temperature,
Ta(0) is the ambient temperature on a measurement of the reference wavelength,
$\beta$ is the light-intensity coefficient of a laser diode (LD) (LD light-intensity coefficient),
PLD is the current light intensity of the LD, and
P(0)LD is the light intensity of the LD (LD light intensity) on a measurement of the reference wavelength.

Note that the temperature coefficient $\alpha$ is represented by the gradient of the graph of an ambient temperature dependency in each of FIGS. 12 through 14, and the LD light-intensity coefficient $\beta$ is represented by the gradient of the graph of a self-temperature dependency of each of FIGS. 12 through 14.

The reference wavelength $\lambda(0)$ is preferably the As described above-described weighted-average wavelength. In this case, the current wavelength $\lambda$ is substantially the weighted-average wavelength as well.

Using the above-described formula (10) allows accurately estimating the current wavelength $\lambda$ even with any values of the current ambient temperature and the LD light intensity.

However, the LD light intensity PLD is obtained by the above-described formulas (6-1) through (9-1), or formula (11) to be described below that defines the relations of the LD light intensity PLD and the monitor light intensity Pmoni. Alternatively, the LD light intensity PLD is preliminarily determined by using the look-up table of FIG. 9, in which the monitor light intensity Pmoni is calculated for each the external light luminance for each the ambient temperature Ta, and formula (11).

That is, the wavelengths $\kappa(R)$, $\lambda(G)$, and $\lambda(B)$, i.e., the power balance $\omega(R)$, $\omega(G)$, and $\omega(B)$ can also be preliminarily prepared as the look-up table.

Irrespective of whether the wavelengths $\lambda(R)$, $\lambda(G)$, and $\lambda(B)$ and the power balance $\omega(R)$, $\omega(G)$, and $\omega(B)$ are prepared as the look-up table or the wavelengths $\lambda(R)$, $\lambda(G)$, and $\lambda(B)$ and the power balance $\omega(R)$, $\omega(G)$, and $\omega(B)$ are obtained by calculation using the above-described formula (10) for each change in condition, the monitor light intensity Pmoni obtained is to be converted into the LD light intensity PLD.

As a matter of course, if the light utilization efficiency $\eta$main of all the optical elements disposed in the optical paths from each semiconductor laser to the light-receiving element 117a is known, the following relation is established:

$PLD(R) = Pmoni(R)/\eta moni(R),$ $PLD(G) = Pmoni(G)/\eta moni(G),$ and $PLD(B) = Pmoni(B)/\eta moni(B)$ Thus, the LD light intensities PLD(R), PLD(G), and PLD(B), which denote the light intensity of light beams emitted from the semiconductor lasers 111R, 111G, and 111B, are easily set in a direct manner. The value of $\eta$moni is easier than $\eta$main to measure. The LD light intensity under any desired condition is obtained by determining the LD light intensity P(0)LD and the monitor light intensity P(0)moni under a certain "condition" in the initial adjustment, and calculating the following formula (11).

$PLD = Pmoni/P(0)moni \times PLD(0)$ (11).

Then, solving the simultaneous equations of formulas (4) and (10) by assigning the current ambient temperature Ta thereinto obtains current wavelength $\lambda$ and current LD light intensity PLD for each current ambient temperature Ta. Further, the monitor light intensity Pmoni can be obtained by using the above-described formula (11). Note that, the above-described formula (4) may be transformed into the relational expression of the current wavelength $\lambda$ and current LD light intensity PLD.

When the amounts of light emission of light beams emitted from the semiconductor lasers 111R, 111G, and 111B are constant, the reference wavelength $\lambda(0)$ may be obtained under "a certain condition" for any desired ambient temperature Ta(0) and any desired amount of light emission P(0). However, it is unlikely in general that the amount of light emission is constant under one single condition because various types of display image are generated as a virtual image of the HUD 100 and the luminance of the virtual image of the HUD 100 is changed with the luminance outside the vehicle.

In this case, the reference wavelength $\lambda(0)$ is preferably defined as a hypothetical wavelength with the light intensity P(0) of 0 watt (W). This is because no other than the light intensity P(0) of 0 watt (W) is common between the amounts of light emission.

Figure 15:
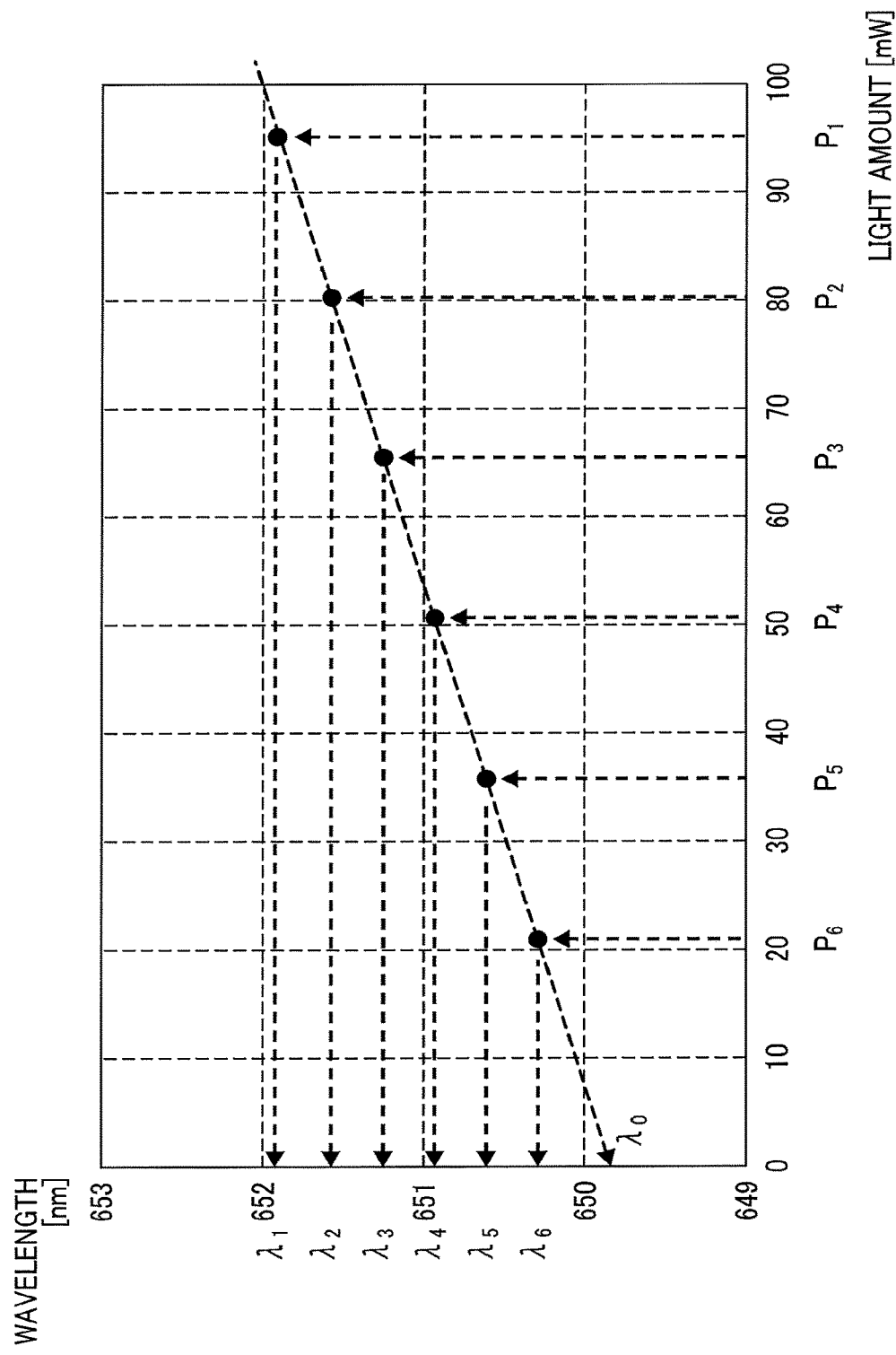
FIG. 15 is an illustration of how to determine a reference wavelength.

As a matter of course, it is impossible to actually measure a wavelength with the amount of light emission P(0) of 0 W. As illustrated in FIG. 15, the amounts P1 through P6 of light emission of the semiconductor laser and the wavelengths $\lambda 1$ through $\lambda 6$ corresponding to the amounts P1 through P6 are linearly interpolated to obtain the virtual wavelength with the amount of light emission P(0) of 0 W. Thus, the obtained hypothetical wavelength is the reference wavelength $\lambda(0)$. The ambient temperature is substantially constant within a very short period of time, and thus little measurement error occurs. Such a process to determine the reference wavelength is preferably performed in the initial adjustment.

In FIG. 15, the amount of light emission of the semiconductor laser is changed in six steps and the wavelengths are estimated for the respective steps. However, no limitation is intended therein. In some embodiments, the LD light intensity of the semiconductor laser may be changed in at least two steps, thereby measuring the wavelength at each step. Most of the semiconductor lasers provide very good linearity, and thereby a reference wavelength $\lambda(0)$ can be determined by obtaining a point of intersection of the straight line that passes through, for example, two plots and the vertical axis. The two plots are obtained by measuring the wavelength in two steps (low LD light intensity and high LD light intensity).

Further, the semiconductor lasers having the same oscillation wavelength bandwidth (the same color) differ in oscillation wavelength within approximately ±5 nanometer (nm) between individuals. Accordingly, the reference wavelength $\lambda(0)$ is preferably measured for an individual semiconductor laser.

On the other hand, the semiconductor lasers does not differ in temperature coefficient $\alpha$ and LD light-intensity coefficient $\beta$ between individuals, and thus the temperature coefficient $\alpha$ and the LD light-intensity coefficient $\beta$ are set to constant values for each color. In some embodiments, the temperature coefficient $\alpha$ and the LD light-intensity coefficient $\beta$ are measured for each semiconductor laser, and the measured values are written in the firmware of the HUD 100 in advance, so as to increase the wavelength estimation accuracy.

The process for obtaining the reference wavelength $\lambda(0)$ in FIG. 15 is performed for each semiconductor laser using a wavelength measuring device, such as a spectrum analyzer. The values of the obtained reference wavelength $\lambda(0)$, ambient temperature Ta(0) on a measurement of the reference wavelength $\lambda(0)$, and the LD light intensity P(0) on a measurement of the reference wavelength $\lambda(0)$ are substituted into the above-described formula (10).

Referring back to FIG. 6, the LD control circuit 700 includes the wavelength estimation unit 700a, a monitor light-intensity target setting unit 700b, and an electric-current value setting unit 700c.

The wavelength estimation unit 700a estimates the wavelength of a light beam emitted from each of the semiconductor laser 111R, 111G, and 111B based on data output from the temperature sensor 130 or the above-described detector. That is, the wavelength estimation unit 700a and the temperature sensor 130 (or the detector) constitutes a wavelength estimation device 7000.

In particular, the wavelength estimation unit 700a calculates the current wavelength 2 of light emitted from each semiconductor laser, according to data regarding the current ambient temperature Ta output from the temperature sensor 130 and the above-described detector, using formulas (4) and (10). Then, the wavelength estimation unit 700a sends the calculation results to the monitor light-intensity target setting unit 700b.

The monitor light-intensity target setting unit 700b sets a target value of a monitor light intensity Pmoni of each color (each semiconductor laser 111R, 111G, and 111B) based on, for example, the calculation results (the wavelengths $\lambda(R)$, $\lambda(G)$, and $\lambda(B)$) of the wavelength estimation unit 700a, color data for each pixel in image data, and the measured values of the illuminometer 900, and sends the set value to the electric-current setting unit 700c. The method for setting the target value of the monitor light intensity Pmoni is as described above.

The electric-current setting unit 700c sets the amount of electric current to be applied to each pixel and each semiconductor laser 111R, 111G, and 111B based on the target value of the monitor light intensity for each pixel and for each color (each semiconductor laser 111R, 111G, and 111B) set by the monitor light-intensity target setting unit 700b. Then, the electric-current setting unit 700c applies a modulated signal according to the amount of electric current to the LD driver 6111 at a predetermined timing in response to a signal output from the scanning photodetector 60. The LD driver 6111 causes the semiconductor lasers 111R, 111G, and 111B to emit light according to the modulated signals, respectively.

This configuration allows adjusting the power balance between and the power of light beams emitted from the three semiconductor lasers 111B, 111G, and 111R thereby to generate a combined light beam (colored light) of a desired color. This further allows the generated combined light beam to scan the imaging area, thereby displaying a virtual image of a desired color with a desired luminance.

Thus, the configuration according to the present embodiment allows displaying a virtual image with a luminance according to the luminance of the external light, in which color information for each pixel in the image data is faithfully reproduced.

Figure 16:
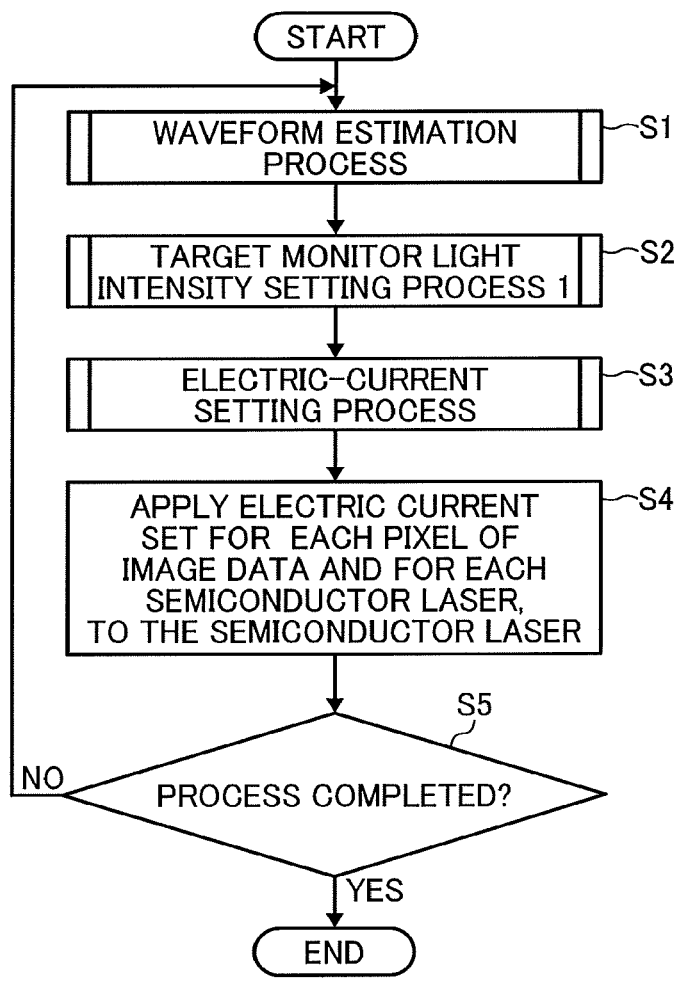
FIG. 16 is a flowchart of a first colored light generating process.

Hereinafter, a description is provided of a first colored-light generating process using the light-source device 300 according to the present embodiment, with referring to FIG. 16. FIG. 16 is a flowchart of a series of computational algorithms executed by the LD controller 700 according to the present embodiment. The first colored light generating process starts when the electrical system of, for example, a vehicle equipped with the HUD 100 is turned on and the HUD 100 is executed. When the HUD 100 starts up, the light deflector 15 starts operating.

In steps S1, S2, and S3, the LD control circuit 700 performs a wavelength estimation process, a first monitor light intensity target setting process, and an electric-current setting process, respectively. The LD control circuit 700 performs the steps S1 through S3 during a time period in which the effective scanning area (the imaging area) is not scanned with a scanning beam (a time period in which an image is not drawn), when the peripheral area of the effective scanning area is scanned with the scanning beam, or during the transition time between the continuous frames. Steps S1 through S3 of FIG. 16 will be described later. Note that steps S1 and S2 may be performed when the scanning light scans the effective scanning area.

In step S4, the LD control circuit 700 applies, to each semiconductor laser 111R, 111G, and 111B, the electric current set for each pixel of image data and for each semiconductor laser 111R, 111G, and 111B. More specifically, the LD control circuit 700 applies the electric current set according to a scanning position to each semiconductor laser 111R, 111G, and 111B during a time period in which the scanning light scans the effective scanning area (the scanning light writes an image in the effective scanning area).

In the next step S5, the HUD 100 determines whether the process is completed. When the electrical system of the vehicle equipped with the HUD 100 is turned on, a negative determination is made in step S5 and the process return to step S1. In contrast, when the electrical system of the vehicle is turned off, an affirmative determination is made in step S5 and the process is completed.

Figure 17:
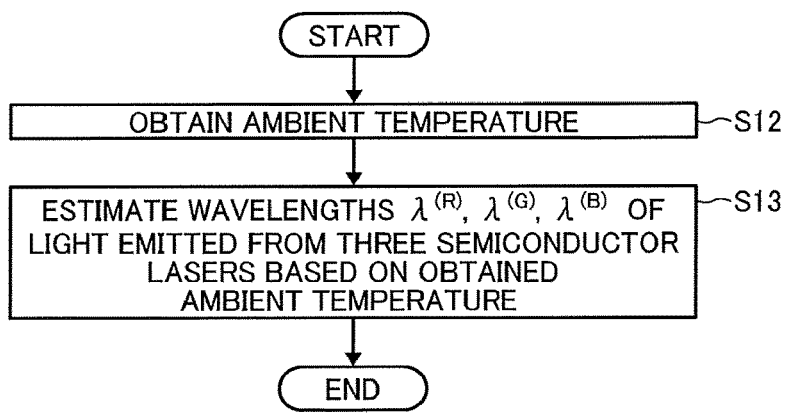
FIG. 17 is a flowchart of a wavelength estimation processes.

A description is provided of a wavelength estimation processes (step S1 in FIG. 16), referring to the flowchart in FIG. 17. The wavelength estimation unit 700a performs the wavelength estimation process.

Initially in step S12, the wavelength estimation unit 700a obtains an ambient temperature of the light-source device 300. Particularly, the temperature sensor 130 or the above-described detector receives a detection result.

In the next step S13, the wavelength estimation unit 700a estimates the wavelengths $\lambda(R)$, $\lambda(G)$, and $\lambda(B)$ of light beams emitted from three semiconductor lasers 111R, 111G, and 111B based on the ambient temperature Ta (the current ambient temperature). Specifically, the wavelength estimation unit 700a calculates the wavelengths $\lambda(R)$, $\lambda(G)$, and $\lambda(B)$ using the above-described formulas (4), (10), and (11). When step S13 is completed, the wavelength estimation process is completed.

Figure 18:
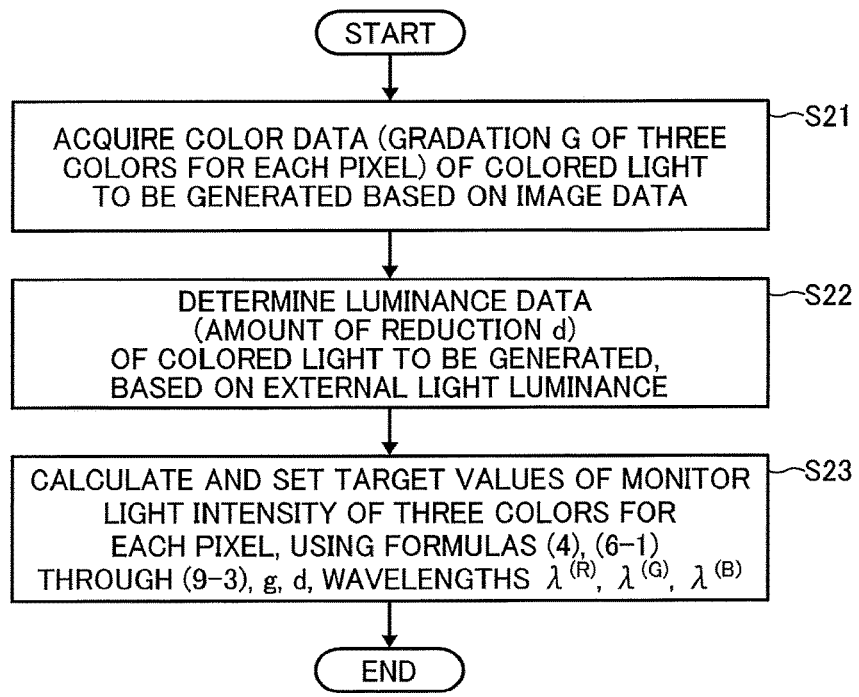
FIG. 18 is a flowchart of a first monitor light-intensity target setting process.

A description is provided of a first monitor light-intensity target setting process (step S2 in FIG. 16), referring to the flowchart in FIG. 18. The monitor light-intensity target setting unit 700b performs the first monitor light-intensity target setting process.

In step S21, the monitor light-intensity target setting unit 700b obtains color data (a gradation level g for each pixel in each of three colors) of colored light to be generated. More specifically, the monitor light-intensity target setting unit 700b obtains gradation levels g of three colors (red, green, and blue (RGB)) from color data for each pixel of image data.

In the Next step S22, the monitor light-intensity target setting unit 700b determines luminance data (the amount to be reduced) of colored light to be generated. More specifically, the monitor light-intensity target setting unit 700b obtains the measured value (illuminance) of the illuminometer 900, and determines the amount d to reduce the reference luminance L(0) of 10000 cd/m2. Still more specifically, the monitor light-intensity target setting unit 700b converts the measured value (illuminance) of the illuminometer 900 into luminance, and the converted luminance is divided by the reference luminance L(0), thus obtaining a value d, i.e., the amount of reduction.

In the next step S23, the monitor light-intensity target setting unit 700b determines target values of the monitor light intensities of three colors for each pixel based on the gradation level g obtained in step S21, the amount d of reduction determined in step S22, and the wavelength $\lambda$ estimated in step S13 of FIG. 17, using the above-described formulas (4) and (6-1) through (9-3). More specifically, the monitor light-intensity target setting unit 700b assigns the values of the gradation levels g of the three colors for each pixel (obtained in step S21) and the amount d of reduction (determined in step S22) into formulas (9-1), (9-2), and (9-3). Then, the monitor light-intensity target setting unit 700b determines the calculated values as target values of the monitor light intensities of the three colors (the semiconductor lasers 111R, 111G, and 111B). Note that, the power balance ω(R), ω(G), and ω(B) is obtained from the above-described formula (4) and the wavelengths λ(R), λ(G), and λ(B) with the reference color (for example, the white color) having the reference luminance L(0) and at the ambient temperature in the measurement of wavelengths in step S12 of FIG. 17. Further, the target values of the monitor light intensities of the three colors for each pixel can be obtained from the power balance ω(R), ω(G), and ω(B), the gradation level g, and the amount d of reduction, using the above-described formulas (6-1) through (9-1). When step S23 is completed, the first monitor light-intensity target setting process is completed.

In some embodiments, the look-up table (in which the ambient temperature in the look-up table of FIG. 9 is substituted by the wavelengths λ(R), λ(G), and λ(B)) is preliminarily prepared and stored in the memory. With such a look-up table, the target values of the monitor light intensities of the three colors for each pixel may be obtained from the obtained external-light luminance, gradation levels g of three colors for each pixel, and wavelengths λ(R), λ(G), and λ(B)) in step S23. In such a case, the look-up table does not have to include all of the external-light luminance, all of the gradation levels g, all of the wavelengths λ(R), λ(G), and λ(B), and all of the target values of monitor light intensities to prevent an increase in capacity of memory. That is, at least one of these items may have discrete values, and the values between the discrete values may be obtained by calculation. In some other embodiments, the external-light luminance in the look-up table may be substituted by the amount d of reduction.

In FIG. 18, step S21 and step S22 may be performed in reverse order.

Figure 19:
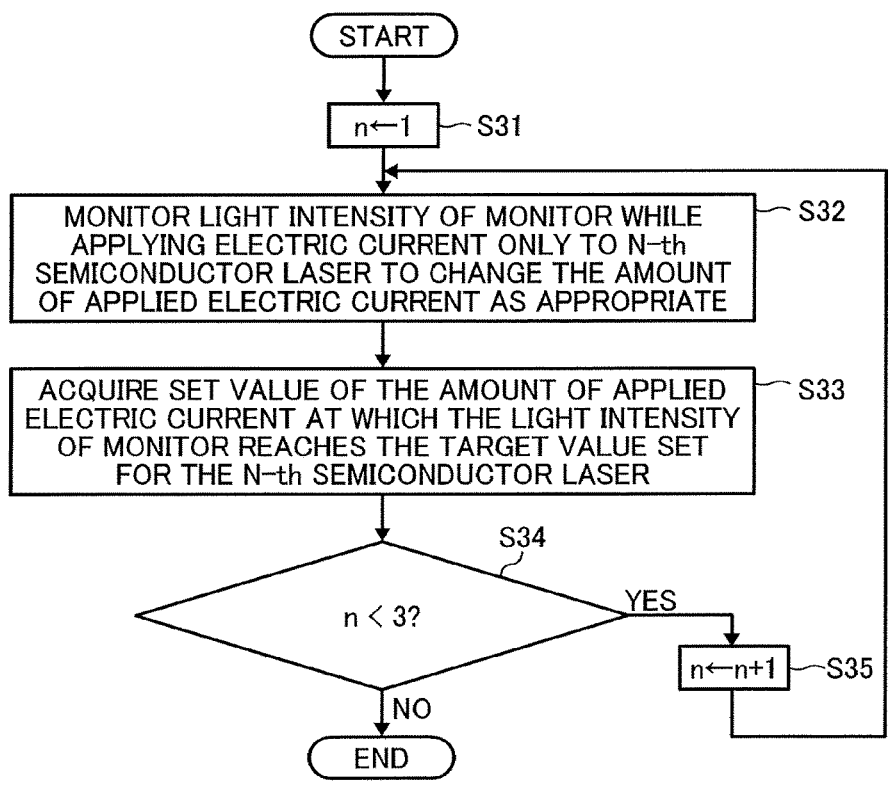
FIG. 19 is a flowchart of an electric-current setting process.

A description is provided of an electric-current setting process (step S3 in FIG. 16), referring to the flowchart in FIG. 19. The electric-current setting unit 700c performs the electric-current setting process. Here, the semiconductor laser 111R, the semiconductor laser 111B, and the semiconductor laser 111G are referred to as a first semiconductor laser, a second semiconductor laser, and a third semiconductor laser, respectively.

In the first step S31, n is set to 1.

In the next step S32, the electric-current setting unit 700c applies the electric current only to the n-th semiconductor laser to change the amount of electric current to be applied as appropriate, and monitors the monitor light intensity (the time-averaged light intensity) output from the signal processing unit 120.

In the next step S33, the electric-current setting unit 700c obtains the amount of electric current to be applied to the n-th semiconductor laser to obtain the target value of the monitor light intensity set for each pixel. In this case, the obtained amount of electric current is considered as the set value for the amount of electric current in displaying each pixel. Note that the amount of electric current (pulsed current) to be applied to each semiconductor is obtained by multiplying pulse amplitude by pulse width ("pulse amplitude"ב"pulse width").

In the next step S34, the electric-current setting unit 700c determines whether n is less than 3 (n<3). When an affirmative determination is made in step S34, the process shifts to step S35. When a negative determination is made in step S34, the process ends.

In step S35, n is incremented. When step S35 is completed, the process returns to step S32.

In FIG. 19, the amount of electric current is set to the semiconductor laser 111R, the semiconductor laser 111G, and the semiconductor laser 111B in that order. However, the present disclosure is not limited to that order.

Note that the electric-current setting process is not limited to the process in FIG. 19. In some embodiments, the electric-current setting unit 700c obtains the amount of electric current to be applied that corresponds to a measured value of monitor light intensity, referring to a table representing the relation of the monitor intensity and the amount of electric current to be applied as indicated by, for example, the graph in FIG. 10. In this case, the table is preliminarily stored in the memory. In other some embodiments, the electric-current setting unit 700c determines the amount of electric current to be applied that corresponds to a measured value of monitor light intensity by assigning the measured value to formula that represents the relation (linear relation) of the monitor intensity and the amount of electric current to be applied as indicated by, for example, the graph in FIG. 10.

In some embodiment, the first colored light generating process does not include the wavelength estimation step (step S1 in FIG. 16). For example, the monitor light-intensity target setting unit 700b obtains the ambient temperature Ta and directly calculates the monitor light intensity Pmoni by using the above-described formulas (4), (10), and (11) in the first monitor light-intensity target setting process. In this case, the wavelength estimation unit 700a is not used in the first monitor light-intensity target setting process. Instead, the detection results of the temperature sensor 130 or the detector is sent to the monitor light-intensity target setting unit 700b.

Figure 20:
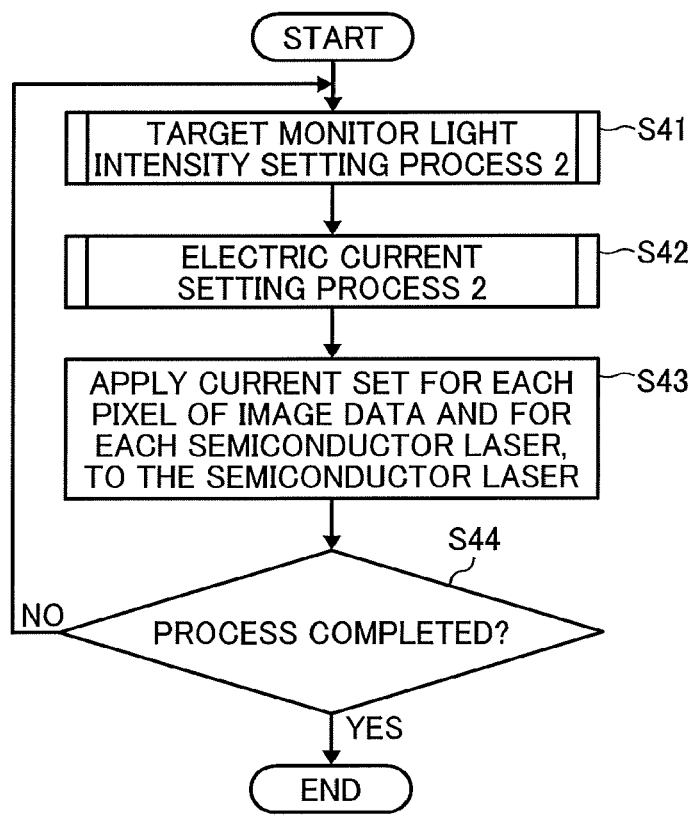
FIG. 20 is a flowchart of a second colored light generating process.

Hereinafter, a description is provided of a second colored-light generating process (a virtual image display process) using the light-source device 300 according to the present embodiment, with referring to FIG. 20. FIG. 20 is a flowchart of a series of computational algorithms executed by the LD controller 700 according to the present embodiment. The second colored light generating process starts when the electrical system of, for example, a vehicle mounted with the HUD 100 is turned on and the HUD 100 is executed. When the HUD 100 starts up, the light deflector 15 starts operating. In the second colored light generating process does not include obtaining a wavelength, which means that the wavelength estimation unit 700a is not used by the LD control circuit 700.

In steps S41 and 42, a second monitor light intensity target setting process and an electric-current setting process are performed, respectively. The steps S41 and S42 are performed during a time period in which the effective scanning area (the imaging area) is not scanned with a scanning beam (a time period in which an image is not drawn), when the peripheral area of the imaging area is scanned with the scanning beam, and during the transition time between the continuous frames. Note that step S41 may be performed when the scanning light scans the effective scanning area. A description will be given later of the second monitor light-intensity target setting process in step S41. The electric-current setting process in step S42 is the same as the electric-current setting process in step S3 in FIG. 16.

In step S43, the LD controller 700 applies the electric current set for each pixel of image data and for each semiconductor laser 111R, 111G, and 111B, to the semiconductor lasers 111R, 111G, and 111B. More specifically, the LD control circuit 700 applies the electric current set according to a scanning position to each semiconductor laser 111R, 111G, and 111B during a time period in which the scanning light scans the effective scanning area (the scanning light writes an image in the effective scanning area).

In step S44, the HUD 100 determines whether the process is completed. When the electrical system of the vehicle mounted with the HUD 100 is turned on, a negative determination is made in step S44 and the process return to step S41. In contrast, when the electrical system of the vehicle is turned off, an affirmative determination is made in step S44 and the process is completed.

Figure 21:
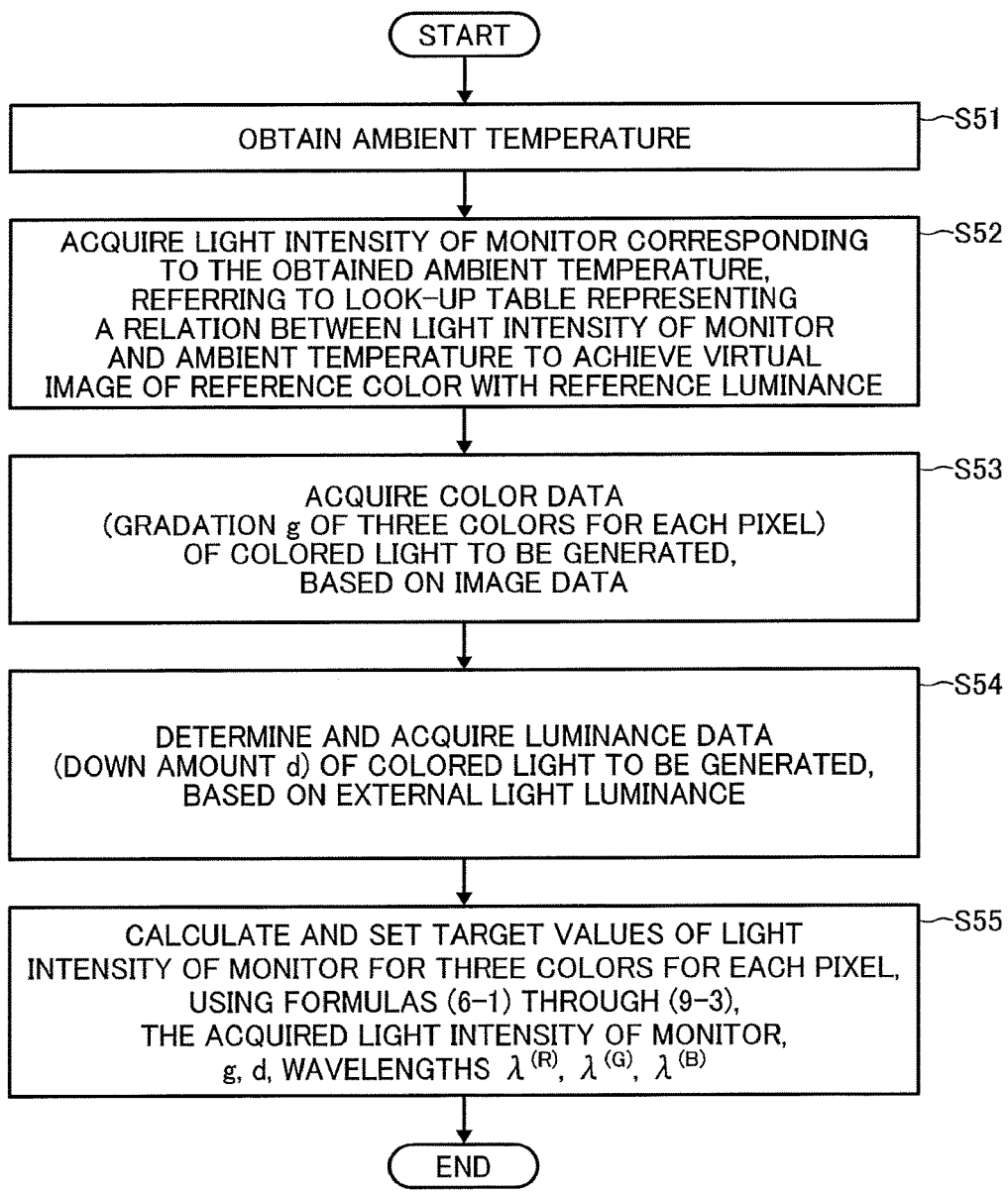
FIG. 21 is a flowchart of a second monitor light-intensity target setting process.

A description is provided of a second monitor light-intensity target setting process (step S41 in FIG. 20), referring to the flowchart in FIG. 21. The monitor light-intensity target setting unit 700b performs the second monitor light-intensity target setting process.

Initially in step S51, the wavelength estimation unit 700a obtains an ambient temperature of the light-source device 300. Particularly, the temperature sensor 130 or the above-described detector receives a detection result.

In the next step S52, the monitor light-intensity target setting unit 700b obtains monitor light intensity corresponding to the ambient temperature obtained in step S51, referring to the look-up table (in which items of the external-light luminance and the gradation are eliminated from the look-up table in FIG. 9) that represents the relation of the ambient temperature and the monitor light intensity to achieve the reference luminance L(0) of a virtual image of the reference color (for example, white color).

In step S53, the monitor light-intensity target setting unit 700b obtains color data (gradation levels g of three colors for each pixel) of colored light to be generated, based on image data. More specifically, the monitor light-intensity target setting unit 700b obtains gradation levels g of three colors (red, green, and blue (RGB)) from color data for each pixel of image data.

In the Next step S54, the monitor light-intensity target setting unit 700b determines luminance data (the amount to be reduced) of colored light to be generated, based on the luminance of the external light. More specifically, the monitor light-intensity target setting unit 700b obtains the measured value (illuminance) of the illuminometer 900, and determines the amount d to reduce the reference luminance L(0) of 10000 cd/m2. Still more specifically, the monitor light-intensity target setting unit 700b converts the measured value (illuminance) of the illuminometer 900 into luminance, and the converted luminance is divided by the reference luminance L(0), thus obtaining a value d, i.e., the amount of reduction.

In the next step S55, the monitor light-intensity target setting unit 700b determines target values of the monitor light intensities of three colors for each pixel based on the monitor light intensity obtained in step S52 and formulas (6-1) through (9-3), the gradation levels g of three colors for each pixel obtained in step S53, and the amount d of reduction determined in step S54. More specifically, the monitor light-intensity target setting unit 700b assigns the values of the gradation levels g of the three colors for each pixel (obtained in step S51) and the amount d of reduction (determined in step S52) into formulas (9-1), (9-2), and (9-3). Then, the monitor light-intensity target setting unit 700b determines the calculated values as target values of the monitor light intensities of the three colors (the semiconductor lasers 111R, 111G, and 111B). When step S55 is completed, the second monitor light-intensity target setting process is completed.

In some embodiments, the look-up table (the look-up table of FIG. 9) that represents the ambient temperature, the external-light luminance, the gradation, the target value of monitor light intensity for each pixel of each color is preliminarily prepared and stored in the memory. The target values of the monitor light intensities of the three colors for each pixel may be obtained from the detection results of the temperature sensor 130 and the above-described detector, the external-light luminance, and gradation levels g of three colors for each pixel, using such a look-up table. In such a case, the look-up table does not have to include all of the ambient temperatures, all of the external-light luminance, all of the gradation levels g, and all of the target values of monitor light intensities to prevent an increase in capacity of memory. That is, at least one of these items may have discrete values, and the values between the discrete values may be obtained by calculation. In some other embodiments, the external-light luminance may be substituted by the amount d of reduction in FIG. 9.

In FIG. 21, at least one of step S53 and S54 and step in advance may be performed before step S51. Further, step S53 and step S54 may be performed in reverse order.

Figure 22:
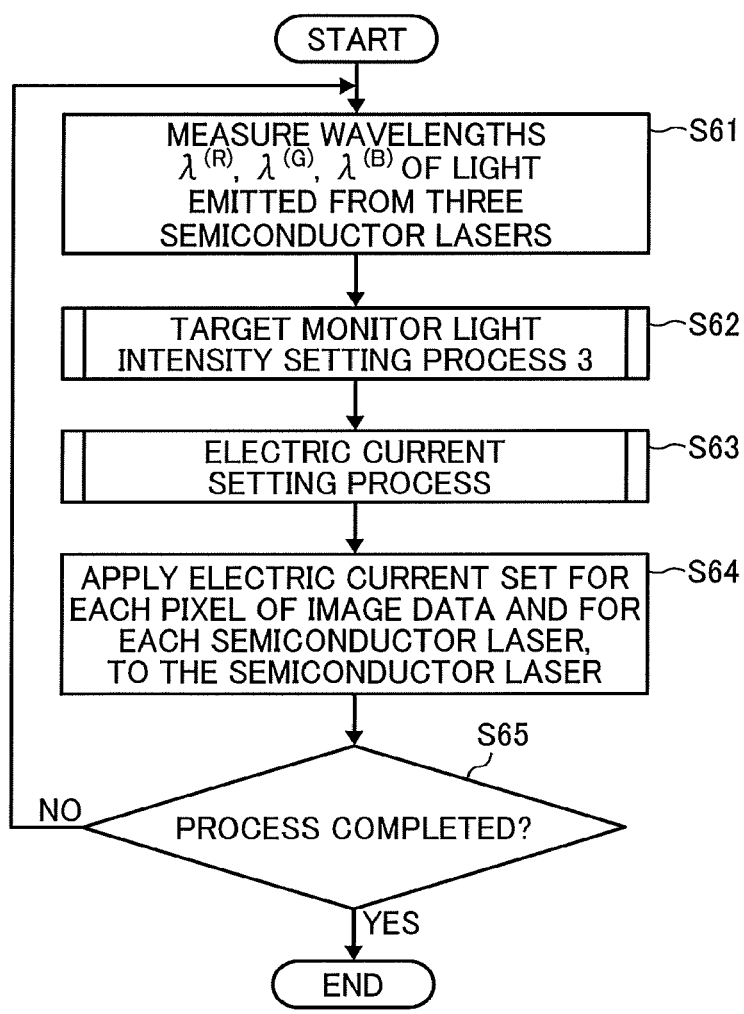
FIG. 22 is a flowchart of a third colored light generating process.

Hereinafter, a description is provided of a third colored-light generating process (a virtual image display process) using the light-source device 300 according to the present embodiment, with referring to FIG. 22. FIG. 22 is a flowchart of a series of computational algorithms executed by the LD controller 700 according to the present embodiment. The third colored light generating process starts when the electrical system of, for example, a vehicle equipped with the HUD 100 is turned on and the HUD 100 is executed. When the HUD 100 starts up, the light deflector 15 starts operating. In the third colored light generating process, the LD control circuit 700 causes a wavelength measuring unit to be described below to measure a wavelength, which means that the wavelength estimation unit 700a is not used in the third colored light generating process.

In the first step S61, the LD control circuit 700 measures the wavelengths λ(R), λ(G), and λ(B) of light beams emitted from the semiconductor lasers 111R, 111G, and 111B. More specifically, the LD control circuit 700 measures the wavelengths λ(R), λ(G), and λ(B) using a wavelength measuring unit, such as a spectral analyzer that utilizes the superheterodyne method or a spectrometer (a prism or a diffraction grating). The wavelength measuring unit is positioned such that one of light beams separated by the optical branch element 115 traveling to the light-receiving element 116 or the light deflector 15 is further separated by another optical branch element, and the separated light beam enters the wavelength measuring unit.

In Steps S62 and S63, a third monitor light intensity target setting process and an electric-current setting process are performed, respectively. The step S62 is performed during a time period in which the effective scanning area (the imaging area) is not scanned with a scanning beam (a time period in which an image is not drawn), when the peripheral area of the imaging area is scanned with the scanning beam, and during the transition time between the continuous frames. Note that step S62 may be performed when the scanning light scans the effective scanning area. A description will be given later of the third monitor light-intensity target setting process in step S62. The electric-current setting process in step S63 is the same as the electric-current setting process in step S3 in FIG. 16.

In step S64, the LD controller 700 applies the electric current set for each pixel of image data and for each semiconductor laser 111R, 111G, and 111B, to the semiconductor lasers 111R, 111G, and 111B. More specifically, the LD control circuit 700 applies the electric current set according to a scanning position to each semiconductor laser 111R, 111G, and 111B during a time period in which the scanning light scans the effective scanning area (the scanning light writes an image in the effective scanning area).

In step S65, the HUD 100 determines whether the process is completed. When the electrical system of the vehicle mounted with the HUD 100 is turned on, a negative determination is made in step S65 and the process return to step S61. In contrast, when the electrical system of the vehicle is turned off, an affirmative determination is made in step S65 and the process is completed.

Figure 23:
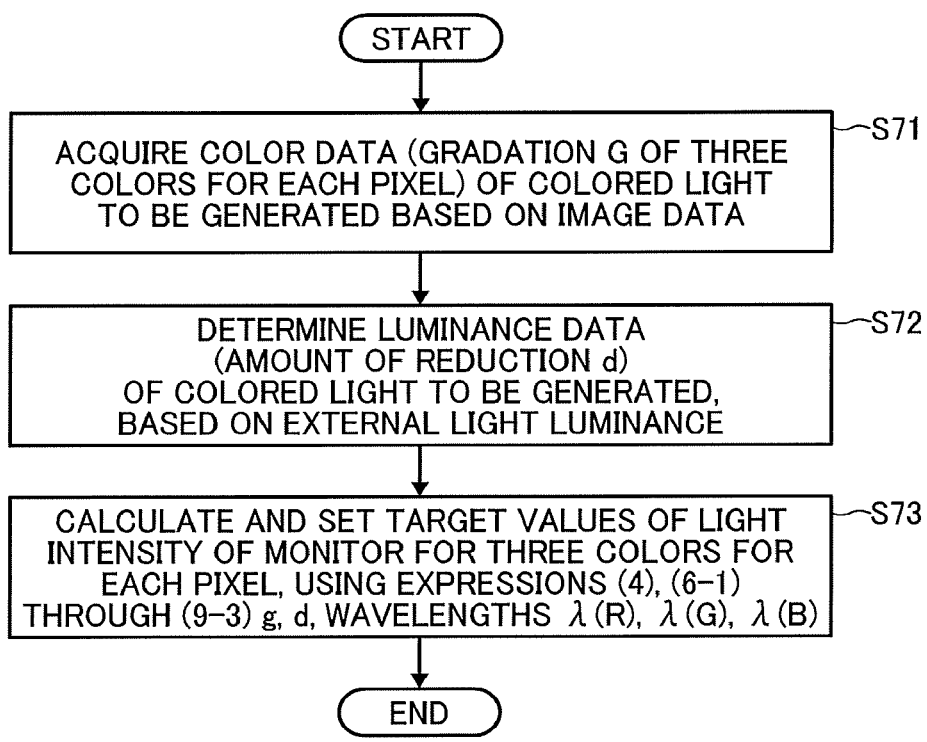
FIG. 23 is a flowchart of a third monitor light-intensity target setting process.

A description is provided of a third monitor light-intensity target setting process (step S62 in FIG. 22), referring to the flowchart in FIG. 23. The monitor light-intensity target setting unit 700b performs the third monitor light-intensity target setting process.

In step S71, the monitor light-intensity target setting unit 700b obtains color data (a gradation level g for each pixel in each of three colors) of colored light to be generated. More specifically, the monitor light-intensity target setting unit 700b obtains gradation levels g of three colors (red, green, and blue (RGB)) from color data for each pixel of image data.

In the next step S72, the monitor light-intensity target setting unit 700b determines luminance data (the amount to be reduced) of colored light to be generated. More specifically, the monitor light-intensity target setting unit 700b obtains the measured value (illuminance) of the illuminometer 900, and determines the amount d to reduce the reference luminance L(0) of 10000 cd/m2. Still more specifically, the monitor light-intensity target setting unit 700b converts the measured value (illuminance) of the illuminometer 900 into luminance, and the converted luminance is divided by the reference luminance L(0 ), thus obtaining a value d, i.e., the amount of reduction.

In the next step S73, the monitor light-intensity target setting unit 700b determines target values of the monitor light intensities of three colors for each pixel based on the gradation level g obtained in step S71, the amount d of reduction determined in step S72, and the wavelength λ measure in step S61 of FIG. 22, using the above-described formulas (4) and (6-1) through (9-3). More specifically, the monitor light-intensity target setting unit 700b assigns the values of the gradation levels g of the three colors for each pixel (obtained in step S71) and the amount d of reduction (determined in step S72) into formulas (9-1), (9-2), and (9-3). Then, the monitor light-intensity target setting unit 700b determines the calculated values as target values of the monitor light intensities of the three colors (the semiconductor lasers 111R, 111G, and 111B). Note that, the power balance ω(R), ω(G), and ω(B) is obtained from the above-described formula (4) and the wavelengths λ(R), λ(G), and λ(B) with the reference color (for example, the white color) having the reference luminance L(0) and at the ambient temperature in the measurement of wavelengths in step S61 of FIG. 22. Further, the target values of the monitor light intensities of the three colors for each pixel can be obtained from the power balance ω(R), ω(G), and ω(B), the gradation level g, and the amount d of reduction, using the above-described formulas (6-1) through (9-1). When step S73 is completed, the third monitor light-intensity target setting process is completed.

In some embodiments, the look-up table (in which the ambient temperature in the look-up table of FIG. 9 is substituted by the wavelengths λ(R), λ(G), and λ(B)) is preliminarily prepared and stored in the memory. With such a look-up table, the target values of the monitor light intensities of the three colors for each pixel may be obtained from the obtained external-light luminance, gradation levels g of three colors for each pixel, and wavelengths λ(R), λ(G), and λ(B)) in step S73. In such a case, the look-up table does not have to include all of the external-light luminance, all of the gradation levels g, all of the wavelengths λ(R), λ(G), and λ(B), and all of the target values of monitor light intensities to prevent an increase in capacity of memory. That is, at least one of these items may have discrete values, and the values between the discrete values may be obtained by calculation. In some other embodiments, the external-light luminance in the look-up table may be substituted by the amount d of reduction.

In FIG. 23, step S71 and step S72 may be performed in reverse order.

The light-source device 300 according to one embodiment includes a semiconductor laser (a light-emitting element), a light-receiving system LR, a wavelength estimation unit 700a (an acquisition unit), a monitor light-intensity target setting unit 700b (a setting unit), and an electric-current setting unit 700c (adjuster). The light-receiving system LR includes a light-receiving element 117a to receive light emitted from each semiconductor laser. The wavelength estimation unit 700a obtains a wavelength of light emitted from each semiconductor laser 111R, 111G, and 111B. The monitor light-intensity target setting unit 700b sets a target value of monitor light intensity (the amount of received light) of the light-receiving system LR. The electric-current setting unit 700c adjusts the amount of light emission (the amount of electric current to be applied to each semiconductor laser 111R, 111G, and 111B) of each semiconductor laser 111R, 111G, and 111B to obtain the target value of the monitor light intensity.

In the present disclosure, the "desired-colored light" refers to colored light (a combined light beam of a single color or plural colors) with at least good color reproduction (in which an appropriate power balance between colored light beams to be combined is obtained). More preferably, the desired-cored light refers to colored light (a combined light beam) with good color reproduction and visibility (having an appropriate brightness).

The light-source device 300 according to one embodiment can generate desired-colored light.

The light-source device 300 further includes a detection system (the temperature sensor 130 or the above-described detector) to detect the ambient temperature of each semiconductor laser 111R, 111B, and 111G. The wavelength estimation unit 700a estimates a wavelength based on the monitor light intensity of the light-receiving system LR and the measured temperature of the temperature sensor 130.

In this case, a dedicated wavelength measuring unit is not used in the light-source device 300, which prevents the complexity of the structure of the light-source device 300.

The light-source device 300 according to another embodiment includes a semiconductor laser (a light-emitting element), a light-receiving system LR, a detection system (a temperature sensor 130 or a detector), a monitor light-intensity target setting unit 700b (a setting unit), and an electric-current setting unit 700c (adjuster). The light-receiving system LR includes a light-receiving element 117a to receive light emitted from each semiconductor laser. The detection system detects the ambient temperature of semiconductor lasers 111R, 111G, and 111B. The monitor light-intensity target setting unit 700b sets a target value of monitor light intensity (the amount of received light) of the light-receiving system LR based on detection results of the detection system. The electric-current setting unit 700c adjusts the amount of light emission (the amount of electric current to be applied to each semiconductor laser 111R, 111G, and 111B) of each semiconductor laser 111R, 111G, and 111B to obtain the target value of the monitor light intensity.

The light-source device 300 according to even another embodiment includes a semiconductor laser (a light-emitting element), a light-receiving system LR, a detection system (a temperature sensor 130 or a detector), a memory, a monitor light-intensity target setting unit 700b (a setting unit), and an electric-current setting unit 700c (adjuster). The light-receiving system LR includes a light-receiving element 117a to receive light emitted from each semiconductor laser. The detection system detects the ambient temperature of semiconductor lasers 111R, 111G, and 111B. The memory stores a look-up table (a table) representing a relation of a target value of monitor light intensity (the amount of received light) of at least light-receiving system LR and the ambient temperature, used to generate desired-colored light. The monitor light-intensity target setting unit 700b sets a target value of monitor light intensity (the amount of received light) of the light-receiving system LR based on detection results of the detection system and the look-up table. The electric-current setting unit 700c adjusts the amount of light emission (the amount of electric current to be applied to each semiconductor laser 111R, 111G, and 111B) of each semiconductor laser 111R, 111G, and 111B to obtain the target value of the monitor light intensity.

The light-source device 300 according to still another embodiment includes a semiconductor laser (a light-emitting element), a light-receiving system LR, a detection system (a temperature sensor 130 or a detector), a memory, a monitor light-intensity target setting unit 700b (a setting unit), and an electric-current setting unit 700c (adjuster). The light-receiving system LR includes a light-receiving element 117a to receive light emitted from each semiconductor laser. The detection system detects the ambient temperature of semiconductor lasers 111R, 111G, and 111B. The memory stores a look-up table (a table) representing a relation of a first target value of monitor light intensity (the amount of received light) of at least light-receiving system LR and the ambient temperature, used to generate colored light of the reference color (desired-colored light). The monitor light-intensity target setting unit 700b sets a second target value of monitor light intensity (the amount of received light) of the light-receiving system LR based on detection results of the detection system and the look-up table. The electric-current setting unit 700c adjusts the amount of light emission (the amount of electric current to be applied to each semiconductor laser 111R, 111G, and 111B) of each semiconductor laser 111R, 111G, and 111B to obtain the second target value of the monitor light intensity.

The light-source device 300 according to a second aspect through a fourth aspect can generate desired colored light.

In this case as well, desired colored light can be generated with accuracy.

The temperature sensor 130 is preferably disposed at any position to be insusceptible to the temperature of the semiconductor lasers 111R, 111G, and 111B.

Preferably, the wavelength estimation unit 700a estimates a wavelength based on the following formula (1):

$$\lambda = \lambda(0) + \alpha \times (Ta - Ta(0)) + \beta \times (P - P(0)) \quad (1)$$

where
$\lambda$ is the current wavelength,
$\lambda(0)$ is the reference wavelength,
$\alpha$ is temperature coefficient,
Ta is the current ambient temperature,
Ta(0) is the ambient temperature on a measurement of the reference wavelength,
$\beta$ is the light-emission coefficient of a semiconductor laser,
P is the current amount of light emission of the semiconductor laser, and
P(0) is the amount of light emission of the semiconductor laser on a measurement of the reference wavelength.

In this case, the reference wavelength $\lambda(0)$ is preferably defined as a hypothetical wavelength with an amount of light emission P(0) of 0 watt (W).

Preferably, the semiconductor laser oscillates in the multi-longitudinal mode, and the reference wavelength $\lambda(0)$ is a wavelength obtained by weighted-averaging wavelength components having intensities ranging from Id through −20 decibel (dB) in the multi-longitudinal mode where Id is the value of the peak intensity. In this case as well, desired colored light can be generated with accuracy.

Note that the reference oscillation wavelength $\lambda(0)$ is not limited to the weighted-average wavelength, and may be a wavelength included in a spectrum distribution (see FIG. 11 for example) in a multi-longitudinal mode. For example, the reference oscillation wavelength $\lambda(0)$ may be a wavelength having the peak intensity.

When the reference color has the reference luminance L(0) in a virtual image Q (virtual image) displayed by the HUD 100, the following ratios are preferably set: the ratio (the power balance between N colors in a virtual image Q) between the colors in a virtual image Q obtained at the reference temperature T(0) is $\omega 1(0):\omega 2(0): \ldots :\omega N(0)$; and the ratio between corresponding monitor light intensities is P1(0)moni:P2(0)moni: . . . :PN(0)moni. When the reference color has the reference luminance L(0) in a virtual image Q and the ratio (power balance between N colors in the virtual image Q) between the colors in a virtual image Q obtained at any desired temperature T is $\omega 1:\omega 2: \ldots :\omega N$, the ratio in target value of corresponding monitor light intensity is preferably set to $\omega 1/\omega 1(0) \cdot P1(0)moni:\omega 2/\omega 2(0) \cdot P2(0)moni: \ldots :\omega N/\omega N(0) \cdot PN(0)moni$. In this case, N denotes the number of semiconductor lasers.

Preferably, the reference luminance L(0) is obtained when a plurality of semiconductor lasers continuously emit light and the gradation level is maximum.

Preferably, the reference color is the white color. Alternatively, in some embodiments, the reference color may be any other color other than the white color.

Preferably, the monitor light-intensity target setting unit 700b sets a target value of monitor light intensity Pmoni based on the luminance of desired colored light that is determined according to the illuminance (the measured value of the illuminometer 900) of the surrounding environment of the light-source device 300. This configuration allows generating colored light having a luminance according to the luminance of the external light.

Preferably, the monitor light-intensity target setting unit 700b sets a target of monitor light intensity Pmoni based on color data of desired colored light according to image data. This configuration allows generating colored light with a successful color reproduction according to image data.

The light-source device 300 further includes an optical branch element 115 (branch unit) to separate a light beam having passed through a combining unit into transmitted light and reflected light that enters the light-receiving system LR. In this case, a single light-receiving element 117a is sufficient.

The HUD 100 (image display apparatus) includes the light-source device 300, the light deflector 15 (an image forming element) to form an image of light emitted from the light-source device 300, and the screen 30 that the light reflected by the light deflector 15 strikes. Such a HUD 100 can display an image with higher reproducibility and visibility.

The HUD 100 further includes a concave mirror 40 (a light emitter) to emit light that passes through the screen 30 and travels to a front windshield 50 (a transmission and reflection member). Such a HUD enables displaying a virtual image with higher reproducibility and visibility.

A mobile device including the HUD 100 and a mobile object 400 equipped with the HUD 100 allows displaying a virtual image with higher reproducibility and visibility for an operator of an object.

A colored-light generating method according to a first aspect includes obtaining a wavelength of a light beam emitted from a semiconductor laser 111R, 111G, and 111B, setting a target value of monitor light intensity (the amount of received light) of a light-receiving system LR including a light-receiving element 117a to receive the light beam emitted from the semiconductor laser 111R, 111G, and 111B to generate desired colored light based on the wavelength of the light beam, and adjusting the amount of light emission of the semiconductor laser 111R, 111G, and 111B to obtain the target value of the monitor light intensity.

A colored-light generating method according to a second aspect includes detecting ambient temperature of a semiconductor laser 111R, 111G, and 111B, setting a target value of monitor light intensity of a light-receiving system LR including a light-receiving element 117a to receive a light beam emitted from the semiconductor laser 111R, 111G, and 111B to generate desired colored light based on a detection result in the detecting, and adjusting the amount of light emission (the amount of electric current to be applied to the semiconductor laser 111R, 111G, and 111B) of the semiconductor laser 111R, 111G, and 111B to obtain the target value of the monitor light intensity.

A colored-light generating method according to a third aspect includes detecting ambient temperature of a semiconductor laser 111R, 111G, and 111B, setting a target value of monitor light intensity (the amount of received light) to generate desired colored light based on a look-up table that represents a relation between the ambient temperature and a target value of monitor light intensity (the amount of received light) of a light-receiving system LR including a light-receiving element 117a to receive at least a light beam emitted from the semiconductor laser 111R, 111G, and 111B to generate desired colored light and a detection result in the detecting, and adjusting the amount of light emission (the amount of electric current to be applied to the semiconductor laser 111R, 111G, and 111B) of the semiconductor laser 111R, 111G, and 111B to obtain the target value of the monitor light intensity.

A colored-light generating method according to a fourth aspect includes detecting ambient temperature of a semiconductor laser 111R, 111G, and 111B, obtaining a first target value to generate reference colored light setting a target value of monitor light intensity (the amount of received light) to generate reference colored light (light of predetermined color) based on a look-up table that represents a relation between the ambient temperature and the first target value of monitor light intensity (the amount of received light) of a light-receiving system LR including a light-receiving element 117a to receive at least a light beam emitted from the semiconductor laser 111R, 111G, and 111B to generate desired colored light and a detection result in the detecting, and setting a second target value of monitor light intensity of the light-receiving system LR to generate desired colored light based on the first target value obtained in the obtaining, and adjusting the amount of light emission (the amount of electric current to be applied to the semiconductor laser 111R, 111G, and 111B) of the semiconductor laser 111R, 111G, and 111B to obtain the second target value of the monitor light intensity.

The colored-light generating method according to the first through fourth aspects can generate desired colored light.

The light-source device, image display apparatus, object apparatus, and colored light beam generating method according to the present disclosure are not limited to the configurations according to the above-described embodiment, and may be variable as appropriate.

Figure 24:
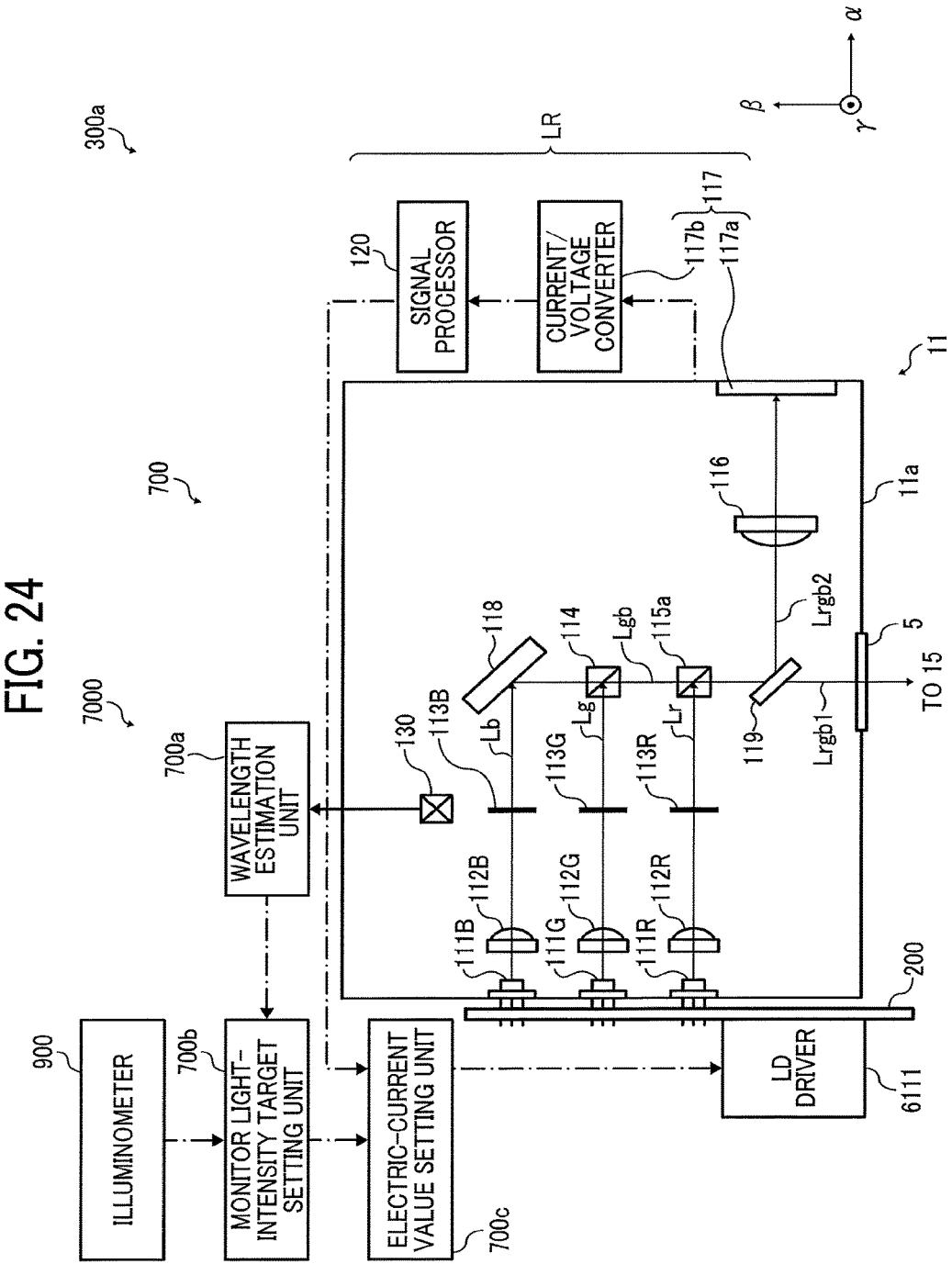
FIG. 24 is an illustration of a light-source device according to variation 1.

As illustrated in FIG. 24 for example, a light-source device 300a according to variation 1 includes an optical combining element 115a (for example, a dichroic mirror) instead of the optical branch element 115 of FIG. 6. In FIG. 24, the light beams pass through the optical combining element 115a, and the combined light beam separates into a transmitted light (Lrgb1) and a reflected light (Lrgb2) at an optical branch element 119 (for example, a beam splitter). The reflected light passes through the condensing lens 116 and enters the light-receiving element 117a.

In the description above, the wavelength of light emitted from the semiconductor is estimated based on both the ambient temperature dependence and the self-temperature dependence of the wavelength of the emitted light. In variation 2 in which the ambient temperature of the semiconductor laser is considered substantially constant, the wavelength of the emitted light may be estimated based only on the self-temperature dependence (only the amount of light received by the light-receiving element 117a or the average light amount). In this case, the temperature sensor 130 and the above-described detector may not be disposed in the HUD 100.

In variation 2, the environment that "the ambient temperature of the semiconductor laser is considered substantially constant" is assumed to be the case in which the temperature in the interior of the vehicle mounted with the HUD 100 is maintained substantially constant by air conditioning or the case in which the temperature in the room is maintained substantially constant by air conditioning when the head-mounted display, the prompter, or the projector as the image display apparatus including the light-source device 1000 with the light-emitting element and the wavelength estimation device 7000 according to the present disclosure is used in the room.

Specifically, using formula (1a) below allows for the estimation of the wavelength of the emitted light.

$$\lambda = \lambda(0) + \beta(P - P(0)) \tag{1a}$$

where $\lambda$ is the current wavelength, $\lambda(0)$ is the reference wavelength, $\beta$ is the light-intensity coefficient, P is the current amount of light emission, and P(0) is the amount of light emission on a measurement of the reference wavelength.

Using formula (1a) can obtain the reference wavelength $\lambda(0)$ same as in the above-described embodiment (refer to FIG. 15). In this case, the estimation target wavelength of the semiconductor laser that oscillates in the multi-longitudinal mode may be, for example, the above-described weighted-average wavelength, or may be the wavelength of the peak intensity.

In some embodiments, a plurality of wavelength estimation devices or wavelength measuring devices may be disposed corresponding to a plurality of semiconductor lasers. For example, each semiconductor laser emits a light beam, and the emitted light beam passes through a branch element (for example, a cover glass covering an opening (an exit) of a package that houses each semiconductor laser, a half mirror, or a beam splitter) to separate into light lays. The separated light lays enter corresponding wave estimation devices or wavelength measuring devices.

As described above, the look-up table in FIG. 9 may include data items regarding the wavelength and the power balance, in addition to the ambient temperature. Alternatively, the look-up table in FIG. 9 may include a data item regarding the monitor light intensity, in addition to the ambient temperature. In such a case, each data item may represent discrete values instead of continuous values. Any value between the represented discrete values may be obtained by computation.

When an end-surface light-emitting semiconductor laser is used as the semiconductor laser, the following configuration is available: Light rays emitted from one end surface form an image to be displayed as a virtual image, and other light rays emitted from the other end surface enter any corresponding wavelength estimation devices or wavelength measuring devices.

Alternatively, in some embodiments, the light-source device according to the present disclosure may include both a light-receiving element and a wavelength measuring device. In such a configuration, some rays of a light beam emitted from each semiconductor laser form an image to be displayed as a virtual image, other rays other than the some rays travels to the wavelength measuring device, the remaining rays enters the light-receiving element.

In some other embodiments, an image forming element, such as a micro-electromechanical system (MEMS) scanner, a polygon scanner, or a galvano scanner, may be used to form an image with a light beam emitted from a semiconductor laser.

In the above-described embodiment and each variation, a laser diodes (LD), such as an end-surface emitting semiconductor laser, is used as the light-emitting element. Alternatively, other types of semiconductor laser, such as a vertical-cavity surface-emitting lasers (VCSEL), or a light-emitting diode (LED) may be used.

In the above-described embodiment and each variation, the light-source unit 300 may include a single or a plurality of light-emitting elements. That is, the configuration according to the above-described embodiment and each variation may be applicable in the cases where a single of light-emitting element is used to generate a single-colored light beam.

In the above-described embodiments, the projector is a concave mirror 40. However, the present disclosure is not limited to the configuration, and the projector may be a convex surface.

In the example embodiment described above, the HUD 100 includes the scanning mirror 20, but may not include the scanning mirror 20. In other words, the HUD 100 may allow light deflected by the light deflector 15 to directly go to the screen 30 or to pass through the convex lens and go to the screen 30. In alternative to the scanning mirror 20, any desired planar mirror may be provided.

Moreover, the transmission and reflection member is not limited to a front windshield (front window) of a mobile object, and may be, for example, a side windshield or a rear windshield. That is, the transmission and reflection member is preferably a window member (windshield) that is mounted on a mobile object for a passenger in a vehicle to view the outside of the mobile object.

In the above-described embodiment and each variation, cases in which the image display apparatus (HUD 100) is provided for a mobile object such as a vehicle, an aircraft, and a ship were described. However, no limitation is indicated thereby, and modification may be made as long as the image display apparatus is provided for an object. The term "object" includes not only a mobile object but also an object that is located on a permanent basis or an object that is transportable.

The image display apparatus according to the present disclosure is applicable not only in the HUD but also in, for example, a head mount display (HMD), a prompter, or a projector. In such a case as well, any desired colored light can be generated.

For example, in the case that the image display is applied to a projector, the projector can be configured in the same manner as in the HUD 100. In other words, image light is projected onto a projection screen or a wall through the concave mirror 40. Alternatively, image light may be projected onto a projection screen or a wall through the screen 30 without the concave mirror 40. As an alternative to the concave mirror 40, any desired free-form surface mirror may be provided. Alternatively, in some embodiments, the screen 30 is not provided such that image light is directly projected onto a projection screen or a wall, or image light is reflected by the concave mirror 40 before projected onto a projection screen or a wall.

In the present disclosure, the luminance of colored light does not have to be determined according to the luminance of the external light (environmental illuminance) to increase only the color reproducibility of colored light. In other words, the luminance (luminance and illuminance) of the surrounding environment does not have to be obtained by using, for example, an illuminometer, to increase the color reproducibility of colored light. However, the luminance of an image or a virtual image displayed by the image display apparatus according to the present disclosure is preferably determined according to the luminance of the usage environment of the image display apparatus, to increase the visibility.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:
1. A light-source device, comprising:
a light-emitting element configured to emit light;
a light-receiving system configured to receive the light emitted from the light emitting element; and
processing circuitry configured to
   acquire a wavelength of the light emitted from the light emitting element;
   set a target value of an amount of the light received by the light-receiving system based on the acquired wavelength; and adjust an amount of the light emitted from the light emitting element such that the amount of the light reaches the set target value of the light.

2. The light-source device according to claim 1, further comprising a detection system configured to detect an ambient temperature of the light-emitting element,
wherein the processing circuitry is further configured to estimate the wavelength of the light emitted from the light emitting element based on a detection result of the detection system.

3. The light-source device according to claim 2,
wherein the detection system, which is configured to detect the ambient temperature, includes a temperature sensor disposed at a position to be insusceptible to a temperature of the light-emitting element.

4. The light-source device according to claim 1,
wherein the light-emitting element is a semiconductor laser, and
wherein the processing circuitry is further configured to estimate the wavelength of the light based on a formula of $\lambda=\lambda(0)+\alpha\times(Ta-Ta(0))+\beta\times(P-P(0))$,
where
$\lambda$ is the wavelength of the light,
$\lambda(0)$ is a reference wavelength,
$\alpha$ is a temperature coefficient,
Ta is a current ambient temperature,
Ta(0) is an ambient temperature on measurement of the reference wavelength,
$\beta$ is a light-amount coefficient of the semiconductor laser,
P is a current amount of light emitted from the semiconductor laser, and
P(0) is an amount of light emitted from the semiconductor laser on measurement of the reference wavelength.

5. The light-source device according to claim 4,
wherein the reference wavelength $\lambda(0)$ is a hypothetical wavelength when P(0) is 0 W.

6. The light-source device according to claim 4,
wherein the semiconductor laser oscillates in a multi-longitudinal mode, and
wherein the reference wavelength is a wavelength obtained by weighted-averaging wavelength components having intensities ranging from Id to an intensity of −20 decibel (dB) relative to Id,
where Id is a peak intensity of the light emitted by the semiconductor laser.

7. The light-source device according to claim 4, further comprising:
at least one additional semiconductor laser, the semiconductor laser and the at least one additional semiconductor laser constituting a plurality of semiconductor lasers, and
a combining unit configured to combine light beams emitted from the plurality of semiconductor lasers, including the light emitted by the semiconductor laser, into one light beam.

8. The light-source device according to claim 7, further comprising a branch unit to separate the one light beam into transmitted light and reflected light,
wherein the light-receiving system receives the reflected light.

9. The light-source device according to claim 1,
wherein processing circuitry is further configured to set the target value of the amount of the light received by the light-receiving system based on an illuminance of a surrounding environment of the light-source device.

10. The light-source device according to claim 1,
wherein the processing circuitry is further configured to set the target value of the amount of the light received by the light-receiving system based on color data of image data.

11. An image display apparatus, comprising:
the light-source device according to claim 1; and
an image forming element configured to form an image by the light emitted from the light-source device, to be displayed as a display image by the image display apparatus.

12. The image display apparatus according to claim 11, further comprising at least one additional semiconductor laser, the semiconductor laser and the at least one additional semiconductor laser constituting a plurality of semiconductor lasers,
wherein a ratio in an amount of light emission between colors of the plurality of semiconductor lasers in the display image obtained at a reference temperature T(0) with a reference color having a reference luminance L(0) is $\omega 1(0): \omega 2(0): \ldots : \omega N(0)$ and a ratio in the amount of the light received by the light-receiving system between the colors is P1(0)moni: P2(0)rani: . . . :PN(0)moni, and
wherein a ratio in the amount of light emission between the colors of the plurality of semiconductor lasers in the display image obtained at any temperature T with the reference color having the reference luminance L(0) is $\omega 1:\omega 2: \ldots :\omega N$ and a ratio in the target value of the amount of light received by the light-receiving system between the colors is $\omega 1/\omega 1(0)\cdot P1(0)moni:\omega 2/\omega 2(0)\cdot P2(0)moni: \ldots :\omega N/\omega N(0)\cdot PN(0)moni$,
where N denotes a number of the plurality of semiconductor lasers.

13. The image display apparatus according to claim 12,
wherein the reference luminance L(0) is obtained when the plurality of semiconductor lasers continuously emit light and a gradation level is maximum.

14. The image display apparatus according to claim 12, wherein the reference color is white.

15. The image display apparatus according to claim 11, further comprising:
an optical system to project the light for forming the image, which is emitted from the light-source device; and
a transmission and reflection member to make the light projected from the optical system viewable.

16. An object apparatus, comprising:
the image display apparatus according to claim 11; and
an object equipped with the image display apparatus.

17. The object apparatus according to claim 16, wherein the object is a mobile object.

18. A light-source device, comprising:
a light-emitting element configured to emit light;
a light-receiving system configured to receive the light emitted from the light emitting element;
a detection system configured to detect an ambient temperature of the light-emitting element; and
processing circuitry configured to set a target value of an amount of the light received by the light-receiving system based on a detection result of the detection system, and adjust an amount of the light emitted from the light emitting element such that the amount of the light reaches the set target value of the light.

19. The light-source device according to claim 18, further comprising a memory storing a table representing a relation between at least the target value of the light received by the light-receiving system and the ambient temperature of the light-emitting element,
wherein the processing circuitry is further configured to set the target value based on the detection result of the detection system and the stored table.

20. A light-source device, comprising:
a light-emitting element configured to emit light;
a light-receiving system configured to receive the light emitted from the light emitting element;
a detection system configured to detect an ambient temperature of the light-emitting element;
a memory storing a table representing a relation between at least a first target value of the light received by the light-receiving system and the ambient temperature of the light-emitting element: and
processing circuitry configured to set a second target value of the light received by the light-receiving system based on a detection result of the detection system and the stored table, and adjust an amount of the light emitted from the light emitting element to obtain the second target value.

* * * * *